(12) United States Patent  
Namiki et al.

(10) Patent No.: US 12,154,317 B2  
(45) Date of Patent: Nov. 26, 2024

(54) LEARNING APPARATUS, LEARNING METHOD, AND RECORDING MEDIUM

(71) Applicant: NEC Corporation, Tokyo (JP)

(72) Inventors: Shigeaki Namiki, Tokyo (JP); Shoji Yachida, Tokyo (JP); Takashi Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 442 days.

(21) Appl. No.: 17/760,826

(22) PCT Filed: Sep. 25, 2019

(86) PCT No.: PCT/JP2019/037461  
§ 371 (c)(1),  
(2) Date: Mar. 16, 2022

(87) PCT Pub. No.: WO2021/059375  
PCT Pub. Date: Apr. 1, 2021

(65) Prior Publication Data  
US 2022/0343631 A1 Oct. 27, 2022

(51) Int. Cl.  
*G06V 10/764* (2022.01)  
*G06V 10/74* (2022.01)  
*G06V 10/771* (2022.01)

(52) U.S. Cl.  
CPC .......... *G06V 10/764* (2022.01); *G06V 10/761* (2022.01); *G06V 10/771* (2022.01); *G06V 2201/07* (2022.01)

(58) Field of Classification Search  
CPC .. G06V 10/764; G06V 10/761; G06V 10/771; G06V 2201/07; G06V 10/454;  
(Continued)

(56) References Cited

U.S. PATENT DOCUMENTS 11,386,599 B2 * 7/2022 Theis ................. G06T 5/50  
2020/0193269 A1 * 6/2020 Park .................. G06F 17/18

FOREIGN PATENT DOCUMENTS

JP 2010-272053 A 12/2010  
JP 2016-191966 A 11/2016

OTHER PUBLICATIONS

Gopalan, Raghuraman, Ruonan Li, and Rama Chellappa. "Domain adaptation for object recognition: An unsupervised approach." In 2011 international conference on computer vision, pp. 999-1006. IEEE, 2011. (Year: 2011).*

(Continued)

*Primary Examiner* — Edward F Urban  
*Assistant Examiner* — Wassim Mahrouka  
(74) *Attorney, Agent, or Firm* — Sughrue Mion, PLLC

(57) ABSTRACT

The learning apparatus classifies target domain data into (N-c) classes based on unique features of the target domain data, classifies source domain data into N classes based on unique features of the source domain data, and classifies the target domain data and the source domain data into the N classes based on common features of the target domain data and the source domain data. Also, the learning apparatus calculates a first distance between the common features of the target domain data and the source domain data, and calculates a second distance between the unique features of the target domain data and the source domain data. Next, the learning apparatus updates parameters of a common feature extraction unit based on the first distance, and updates parameters of a target domain feature extraction unit and a source domain feature extraction unit based on the second distance.

14 Claims, 15 Drawing Sheets

(58) Field of Classification Search
CPC ............... G06V 10/7796; G06V 10/82; G06V 2201/08; G06N 20/00
See application file for complete search history.

(56) References Cited

OTHER PUBLICATIONS

International Search Report for PCT Application No., PCT/JP2019/037461, mailed on Dec. 3, 2019.
Luo Zelun et al., "Label Efficient Learning of Transferable Representations across Domains and Tasks", v1, Nov. 30, 2017. pp. 1-15, searched on Nov. 26, 2019, <URL: https://arxiv.org/pdf/1712.00123.pdf>.
Bousmalis Konstantinos et al., "Domain Separation Networks", v1. Aug. 22, 2016. p.1-15, searched on Nov. 26, 2019, <URL: https://arxiv.org/pdf/1608.06019.pdf>.

\* cited by examiner

LEARNING APPARATUS, LEARNING METHOD, AND RECORDING MEDIUM

This application is a National Stage Entry of PCT/JP2019/037461 filed on Sep. 25, 2019, the contents of all of which are incorporated herein by reference, in their entirety.

TECHNICAL FIELD

The present disclosure relates to a technique for recognizing an object appearing in an image.

BACKGROUND ART

The present disclosure relates to a technique for recognizing an object appearing in an image. A technique called domain adaptation is known as a technique for compensating for a shortage of training data and improving recognition accuracy from image data obtained in different environments. In this technique, in addition to training data obtained in one environment (source domain), in a case of training an object recognition model using training data obtained in another environment (target domain), the object recognition model is trained so as to perform feature extraction that absorbs a difference between the two domains. By this training, it is possible to ensure the recognition accuracy even for images obtained in different environments. An example of a learning method to which a technique of the domain adaptation is applied is described in Patent Document 1

PRECEDING TECHNICAL REFERENCES

Patent Document

Japanese Laid-open Patent Publication No. 2016-191966

SUMMARY

Problem to be Solved

However, a case where learning image data of a new class to be recognized is insufficient only in a specific domain, there is a problem that recognition accuracy is decreased only for that class.

It is one object of the present disclosure to compensate a shortage of training data for a new class in a case where that new class to be recognized appears, and to prevent a decrease in the recognition accuracy.

Means for Solving the Problem

In order to solve the above problems, according to an example aspect of the present disclosure, there is provided a learning apparatus including:
  a target domain feature extraction unit configured to extract unique features of target domain data;
  a target domain feature identification unit configured to classify the target domain data into (N-c) classes based on the unique features of the target domain data;
  a source domain feature extraction unit configured to extract unique features of source domain data;
  a source domain feature identification unit configured to classify the source domain data into N classes based on the unique features of the source domain data;
  a common feature extraction unit configured to extract common features of the target domain data and common features of the source domain data;
  a common feature identification unit configured to classify the target domain data and the source domain data into the N classes based on the common features of the target domain data and the common features of the source domain data;
  a first distance calculation unit configured to calculate a first distance between the common features of the target domain data and the common features of the source domain data;
  a second distance calculation unit configured to calculate a second distance between the unique features of the target domain data and the unique features of the source domain data; and
  an optimization unit configured to update parameters of the common feature extraction unit based on the first distance, and update parameters of the target domain feature extraction unit and the source domain feature extraction unit based on the second distance.

According to another example aspect of the present disclosure, there is provided a learning method including:
  extracting unique features of target domain data by a target domain feature extraction unit;
  classifying the target domain data into (N-c) classes based on the unique features of the target domain data;
  extracting unique features of source domain data by a source domain feature extraction unit;
  classifying the source domain data into N classes based on the unique features of the source domain data;
  extracting common features of the target domain data and common features of the source domain data by a common feature extraction unit;
  classifying the target domain data and the source domain data into the N classes based on the common features of the target domain data and the common features of the source domain data;
  calculating a first distance between the common features of the target domain data and the common features of the source domain data;
  calculating a second distance between the unique features of the target domain data and the unique features of the source domain data; and
  updating parameters of the common feature extraction unit based on the first distance, and updating parameters of the target domain feature extraction unit and the source domain feature extraction unit based on the second distance.

According to still another example aspect of the present disclosure, there is provided a recording medium storing a program, the program causing a computer to perform a process including:
  extracting unique features of target domain data by a target domain feature extraction unit;
  classifying the target domain data into (N-c) classes based on the unique features of the target domain data;
  extracting unique features of source domain data by a source domain feature extraction unit;
  classifying the source domain data into N classes based on the unique features of the source domain data;
  extracting common features of the target domain data and common features of the source domain data by a common feature extraction unit;

classifying the target domain data and the source domain data into the N classes based on the common features of the target domain data and the common features of the source domain data;

calculating a first distance between the common features of the target domain data and the common features of the source domain data;

calculating a second distance between the unique features of the target domain data and the unique features of the source domain data; and updating parameters of the common feature extraction unit based on the first distance, and updating parameters of the target domain feature extraction unit and the source domain feature extraction unit based on the second distance.

Effect

According to the present disclosure, it becomes possible to compensate a shortage of training data for a new class in a case where that new class to be recognized appears, and to prevent a decrease in recognition accuracy.

EXAMPLE EMBODIMENTS

[Prerequisite Environment]

In the following example embodiments, it is assumed that image data for all of N classes to be recognized are prepared in a source domain; however, image data are not available for some of the N classes (c classes) in a target domain. For instance, in a vehicle type recognition system that recognizes a vehicle type of an automobile, CG image data of automobiles are used as the source domain, and live image data of automobiles are used as the target domain. Here, in a case where it is desired to recognize a newly sold c type of a new vehicle, CG image data can be prepared to some extent, it is difficult to prepare a sufficient amount of the live image data from the beginning. For this reason, CG image data are prepared for all of the N classes to be recognized in the source domain; however, in the target domain, c class live image data corresponding to the new vehicle are insufficient, and live image data for (N-c) classes excluding the class of the new vehicle are prepared. In the following example embodiments, it is assumed in such an environment that a case in which recognition of each vehicle type including a c type of a new vehicle is performed from the live image data of the target domain.

First Example Embodiment

Next, a first example embodiment in the present disclosure will be described.

(Hardware Configuration)

Figure 1:
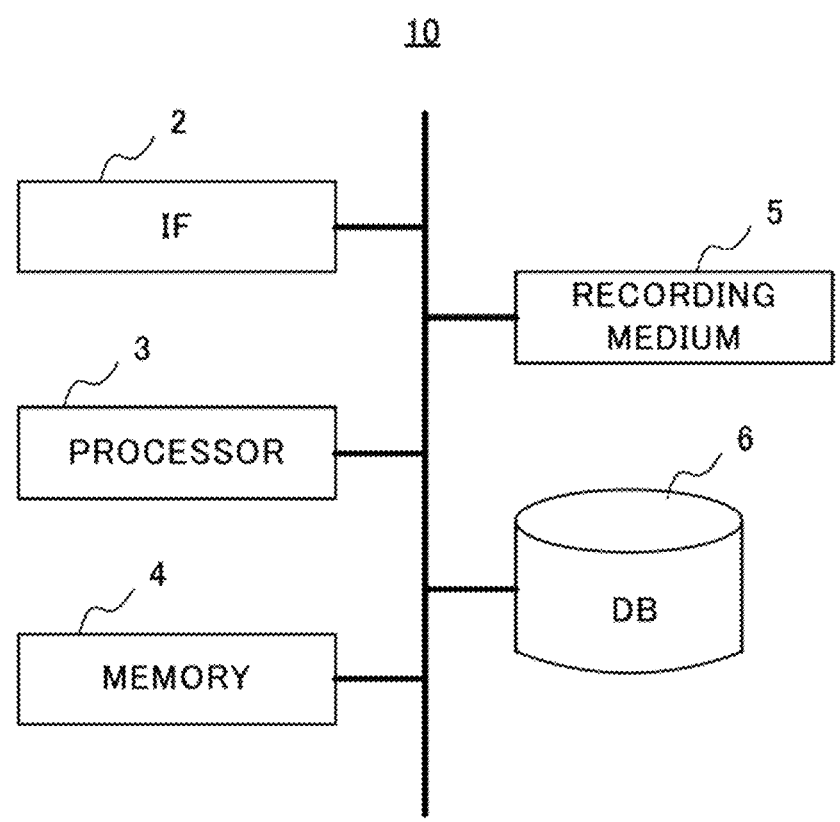
FIG. 1 is a block diagram illustrating a hardware configuration of an object recognition apparatus.

FIG. 1 is a block diagram illustrating a hardware configuration of an object recognition apparatus. As illustrated, an object recognition apparatus 10 includes an interface (IF) 2, a processor 3, a memory 4, a recording medium 5, and a database (DB) 6.

The interface 2 communicates with an external apparatus. Specifically, the interface 2 is used for inputting training data used for learning by the object recognition apparatus 10 and image data of an actual recognition target from an outside, and for outputting a recognition result to the external apparatus.

The processor 3 is a CPU (Central Processing Unit) or a computer such as a a GPU (Graphics Processing Unit) with the CPU, and controls the entire object recognition apparatus 10 by executing a program prepared in advance. The memory 4 is formed by a ROM (Read Only Memory), a RAM (Random Access Memory), or the like. The memory 4 stores various programs to be executed by the processor 3. The memory 4 is also used as a working memory during executions of various processes by the processor 3.

The recording medium 5 is a non-volatile and non-transitory recording medium such as a disk-shaped recording medium or a semiconductor memory, and is configured to be detachable from the object recognition apparatus 10. The recording medium 5 records various programs executed by the processor 3. When the object recognition apparatus 10 executes a learning process or an inference process (that is, an object recognition process), a program recorded on the recording medium 5 is loaded into the memory 4 and executed by the processor 3.

The database 6 stores learning image data used in the learning process of the object recognition apparatus 10. The learning image data includes correct answer labels. In addition to the above, the object recognition apparatus 10 may include an input device such as a keyboard or a mouse, or a display device.

(Basic Algorithm)

Figure 2:
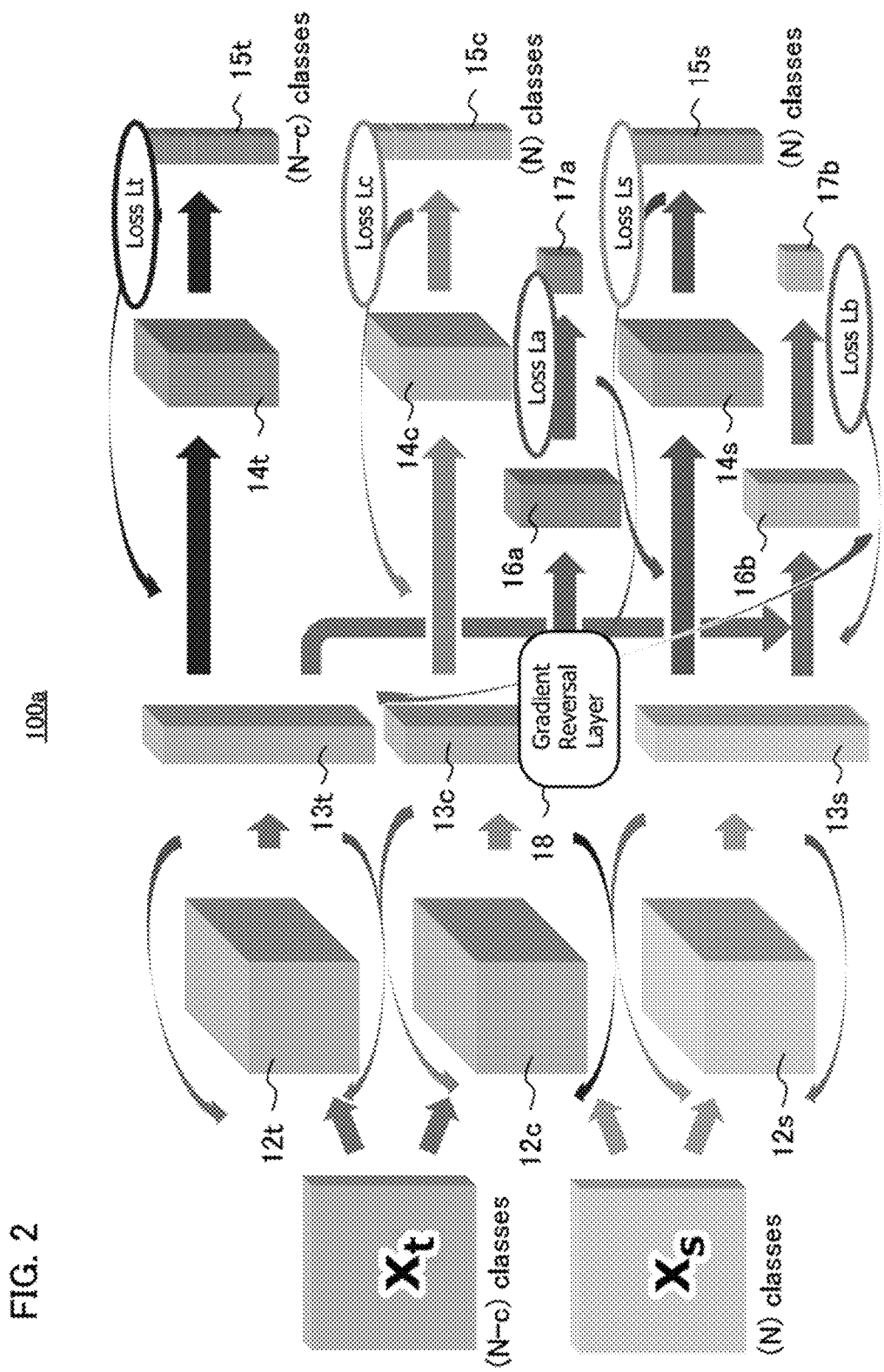
FIG. 2 schematically illustrates a basic algorithm at a time of learning according to a first example embodiment.

First, a basic algorithm for learning will be described. FIG. 2 is a diagram schematically illustrating the basic algorithm at a time of learning according to a first example embodiment. An object recognition apparatus 100a at the time of learning is formed by a neural network for an object recognition. As described above, target domain training data Xt in (N-c) classes and source domain training data Xs in the (N-c) classes are input to the object recognition apparatus 100a at the time of learning. Correct answer labels are prepared in advance for these sets of training data.

The object recognition apparatus 100a roughly includes three networks: a target domain network, a common network, and a source domain network. In the following, a subscript "t" is used for elements related to the target domain network, a subscript "c" is used for elements related to a common network, and a subscript "s" is used for elements related to the source domain network.

The object recognition apparatus 100a includes feature extractors 12t, 12c, and 12s for extracting features from image data, class classifiers 14t, 14c, and 14s, and domain identifiers 16a and 16b. The target domain training data Xt are input to the feature extractors 12t and 12c, and the source domain training data Xs are input to the feature extractors 12c and 12s. The feature extractors 12t, 12c, and 12s are constituted by a network that extracts features of an image by convolution, such as a Res-Net. Moreover, the class classifiers 14t, 14c, and 14s include a fully connected layer to which features extracted by the feature extractors 12t, 12c, and 12s are input. The feature extractor 12t and the class classifier 14t constitute a target domain network, the feature extractor 12c and the class classifier 14c form a common network, and the feature extractor 12s and the class classifier 14s form a source domain network.

The feature extractor 12t extracts features unique to the target domain (hereinafter, referred to as "target domain unique features") 13t from the target domain training data Xt. The feature extractor 12c extracts features common to the target domain and the source domain (hereinafter, referred to as "common features") 13c from the target domain training data Xt and the source domain training data Xs. Note that the common features 13c includes common features extracted from the target domain training data Xt and common features extracted from the source domain training data Xs. The feature extractor 12s extracts features unique to the source domain (hereinafter, referred to as "source domain unique features") 13s from the source domain training data Xs.

The class classifier 14t outputs an identification result 15t of the (N-c) classes based on the target domain unique features 13t. A loss (Loss) Lt is calculated from the outputted identification result 15t of the (N-c) classes and correct answer labels previously prepared, and is backpropagated, so as to update the parameters of the class classifier 14t and the feature extractor 12t. Accordingly, the feature extractor 12t and the class classifier 14t are trained so as to an increase identification accuracy in the target domain.

The classifier 14c outputs an identification result 15c for the N classes based on the common features 13c. A loss Lc is calculated based on the output identification result 15c and the correct answer labels previously prepared, and is backpropagated, so as to update parameters of the class classifier 14c and the feature extractor 12c. Accordingly, the feature extractor 12c and the class classifier 14c are trained to increase identification accuracies in the target domain and the source domain.

Also, the class classifier 14s outputs an identification result 15s for the N classes based on the source domain unique features 13s. A loss Ls is calculated based on the output identification result 15s for the N classes and the correct answer labels previously prepared, and is backpropagated, so as to update parameters of the class classifier 14s and the feature extractor 12s. Accordingly, the feature extractor 12s and the class classifier 14s are trained to increase an identification accuracy in the source domain.

The domain identifier 16a calculates a degree of similarity between the common features 13c input from the feature extractor 12c, that is, common features extracted from the target domain training data Xt, and common features extracted from the source domain training data Xs, and outputs the degree of similarity as a loss La. Here, the lower the degree of similarity between the two common features, the greater a value of the loss La. The calculated loss La is backpropagated to the domain identifier 16a and the feature extractor 12c. At this case, the loss La is backpropagated through a GRL (Gradient Reversal Layer) 18 to the feature extractor 12c. Accordingly, the feature extractor 12c is trained so that a difference between the target domain and the source domain is not seen, that is, so that features common to the target domain and the source domain are extracted.

The domain identifier 16b calculates a degree of similarity between the target domain unique features 13t input from the feature extractor 12t and the source domain unique features 13s input from the feature extractor 12s, and outputs the degree of similarity as a loss Lb. The loss Lb is backpropagated to the domain identifier 16b and the feature extractors 12t and 12s. Accordingly, the feature extractors 12t and 12s are trained to highlight a difference between the target domain and the source domain.

Consequently, the target domain network identifies the (N-c) classes from the target domain training data Xt, and the common network is trained to identify the N classes from the target domain training data Xt. Considering both properties, since the target domain network learns based on the target domain training data Xt, the recognition accuracy is high with respect to the target domain data in the (N-c) classes. In the example of the vehicle type recognition system described above, the target domain network learns about vehicles (hereinafter, also referred to as "existing vehicles") other than the new vehicle of the c type based on a sufficient amount of live image data, and recognition can be realized with high accuracy; however, the new vehicle is not identified since no learning is not conducted based on live image data. On the other hand, the common network learns by utilizing features common between the live image data and CG images in the N classes including the new vehicle. That is, the recognition has become possible with a certain degree of accuracy, because the new vehicle is also learned using the CG image. That is, in a case of inputting the live image, the target domain network can recognize the existing vehicles more precisely, and the common network can recognize the new vehicle more precisely.

Figure 3:
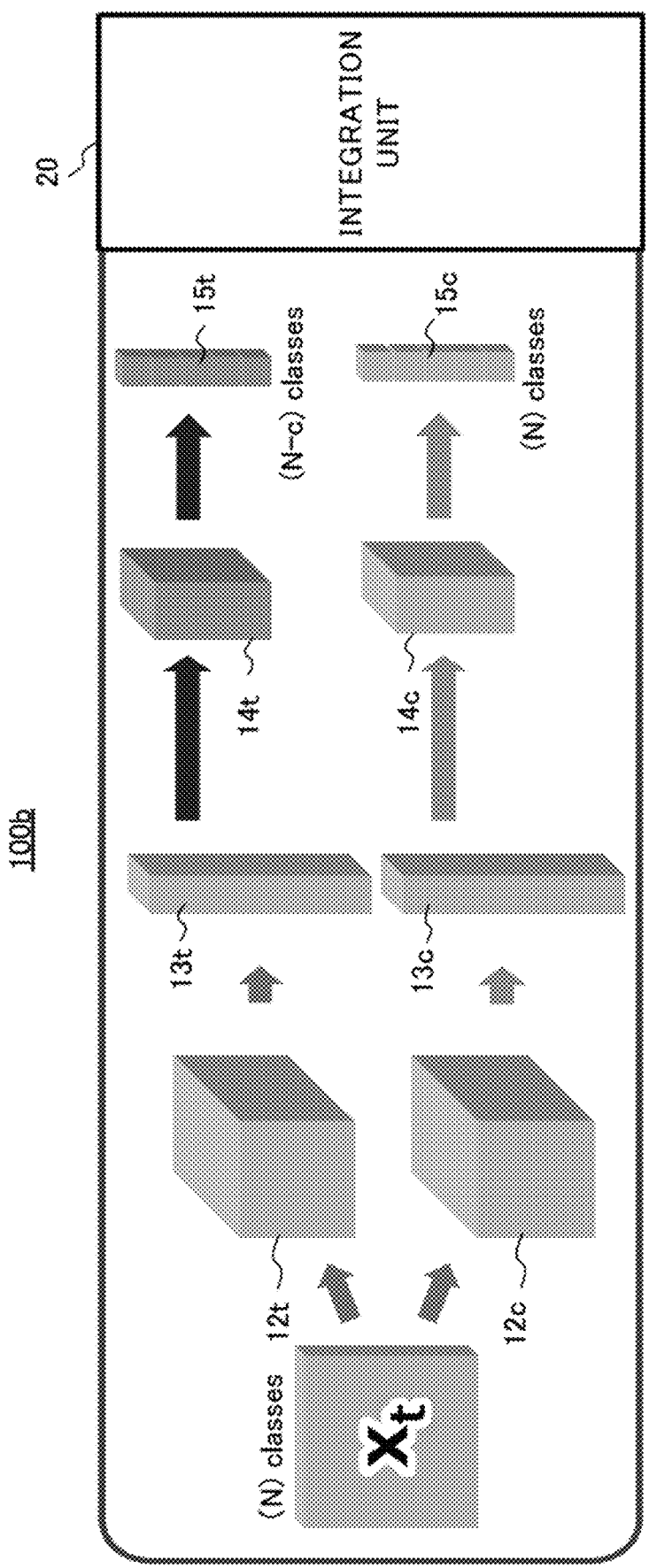
FIG. 3 schematically illustrates a basic algorithm at a time of inferring according to the first example embodiment.

Next, the basic algorithm at a time of inference will be described. FIG. 3 is a diagram schematically illustrating the basic algorithm at the time of inference according to the first example embodiment. An object recognition apparatus 100b at the time of inference uses only the target domain network and the common network in the configuration of the object recognition apparatus 100a at the time of learning illustrated in FIG. 2. That is, the object recognition apparatus 100b at the time of inference includes the trained feature extractors 12t and 12c, the trained class classifier 14t and 14c, and an integration unit 20.

At the time of inference, the target domain image data Xt in the N classes are input as image data to be actual targets for the object recognition. In an example of the vehicle type recognition system described above, live image data in N classes including the c class of the new vehicle are input. The target domain network having the feature extractor 12t and the class classifier 14t outputs the identification result 15t for the (N-c) classes from the input image data. The common network having the feature extractor 12c and the class classifier 14c outputs the identification result 15c for the N classes from the input image data. The integration unit 20 outputs a final identification result based on the identification result 15t for the (N-c) classes and the identification result 15c for the N classes. A process of the integration unit 20 will be described in detail later.

Examples

Next, an example of the object recognition apparatus according to the first example embodiment will be described.

(1) At a Time of Learning

Figure 4:
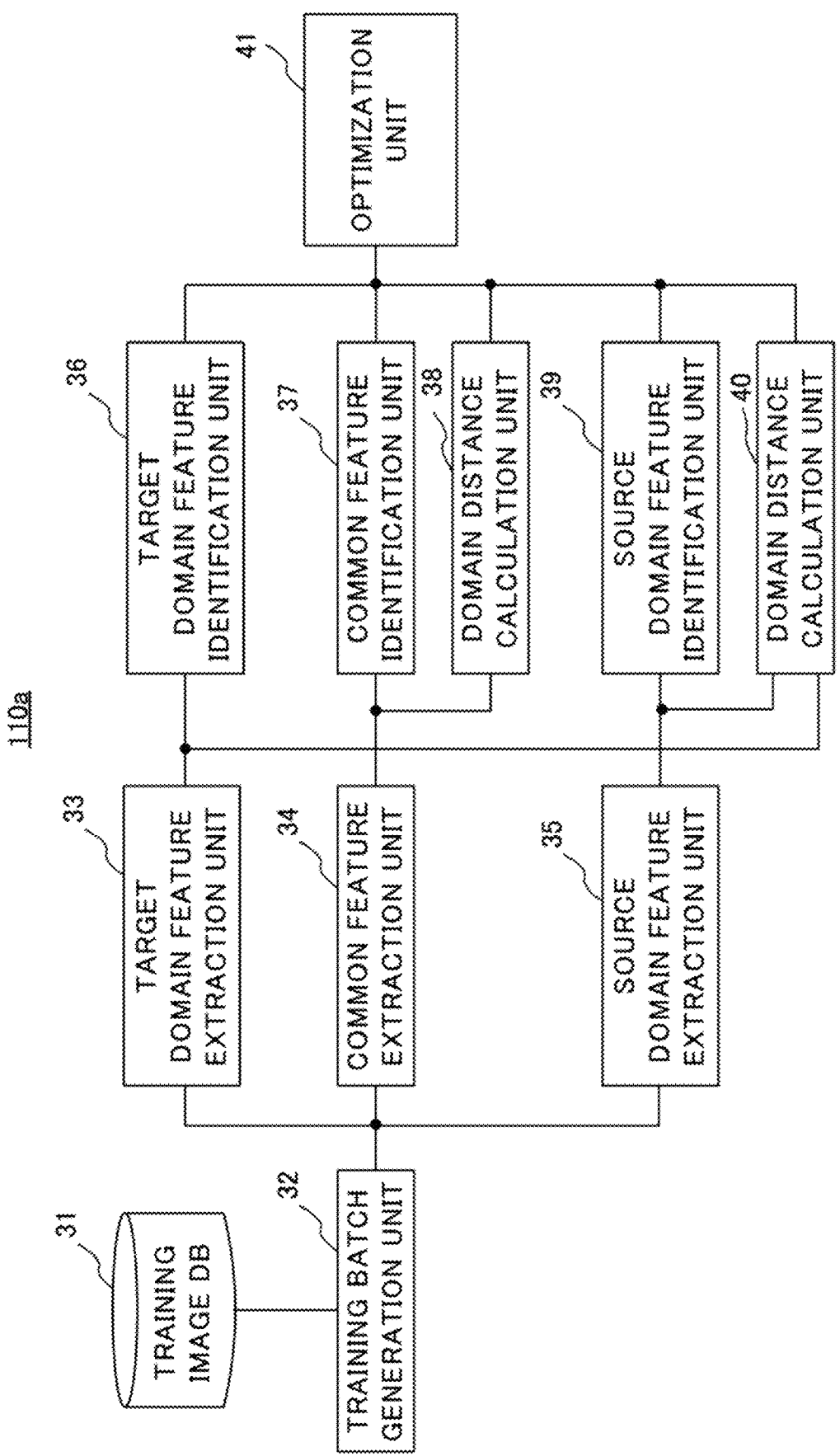
FIG. 4 illustrates a functional configuration of the object recognition apparatus at the time of learning according to the first example embodiment.

FIG. 4 is a block diagram illustrating a functional configuration of an object recognition apparatus 110a at the time of learning according to an example of the first example embodiment. The object recognition apparatus 110a includes a training image database (hereinafter, "database" is referred to as "DB") 31, a training batch generation unit 32, a target domain feature extraction unit 33, a common feature extraction unit 34, a source domain feature extraction unit 35, a target domain feature identification unit 36, a common feature identification unit 37, a domain distance calculation unit 38, a source domain feature identification unit 39, a domain distance calculation unit 40, and an optimization unit 41.

The training image DB 31 stores sets of training data for the target domain and the source domain. Each set of training data includes a correct answer label. The training batch generation unit 32 acquires the training data from the training image DB 31, generates a mini-batch for learning, and outputs the mini-batch to the target domain feature extraction unit 33, the common feature extraction unit 34, and the source domain feature extraction unit 35.

The target domain feature extraction unit 33 corresponds to the feature extractor 12t in FIG. 2, extracts features from target domain training data in the mini-batch by a CNN (Convolutional Neural Network) or the like, and supplies the features to the target domain feature identification unit 36. The common feature extraction unit 34 corresponds to the feature extractor 12c in FIG. 2, extracts features from the target domain training data and the source domain training data in the mini-batch by the CNN or the like, and supplies the features to the common feature identification unit 37. The source domain feature extraction unit 35 corresponds to the feature extractor 12s in FIG. 2, extracts features from the source domain training data in the mini-batch by the CNN or the like, and supplies the features to the source domain feature identification unit 39.

The target domain feature identification unit 36 corresponds to the class classifier 14t in FIG. 2, performs a class classification in the fully connected layer based on the features extracted by the target domain feature extraction unit 33, and supplies a class classification result to the optimization unit 41. The common feature identification unit 37 corresponds to the class classifier 14c in FIG. 2, performs the class classification in the fully connected layer based on the features extracted by the common feature extraction unit 34, and supplies a class classification result to the optimization unit 41. The source domain feature identification unit 39 corresponds to the class classifier 14s in FIG. 2, performs the class classification in the fully connected layer based on the features extracted by the source domain feature extraction unit 35, and supplies a class classification result to the optimization unit 41.

The domain distance calculation unit 38 corresponds to the domain identifier 16a illustrated in FIG. 2, and calculates a distance between the features extracted by the common feature extraction unit 34 from the target domain training data and the features extracted by the common feature extraction unit 34 from the source domain training data, and supplies the distance to the optimization unit 41. The domain distance calculation unit 40 corresponds to the domain identifier 16b illustrated in FIG. 2, and calculates a distance between the features extracted by the target domain feature extraction unit 33 from the target domain training data and the features extracted by the source domain feature extraction unit 35 from the source domain training data, and supplies the distance to the optimization unit 41.

The optimization unit 41 calculates a loss based on the class classification result by the target domain feature identification unit 36 and a correct answer class prepared in advance, and updates parameters of the target domain feature extraction unit 33 and the target domain feature identification unit 36 so that the loss is reduced. Moreover, the optimization unit 41 calculates a loss from the class classification result by the common feature identification unit 37 and the correct answer class prepared in advance, and updates parameters of the common feature extraction unit 34 and the common feature identification unit 37 so that the loss is reduced. Furthermore, the optimization unit 41 calculates a loss from the class classification result by the source domain feature identification unit 39 and the correct answer class prepared in advance, and updates the parameters of the target domain feature extraction unit 33 and the source domain feature identification unit 39 so that the loss is reduced.

Moreover, the optimization unit 41 updates the parameters of the common feature extraction unit 34 so that the distance calculated by the domain distance calculation unit 38 becomes shorter, that is, the features extracted from the target domain training data and the features extracted from the source domain training data approach each other. Furthermore, the optimization unit 41 updates the parameters of the target domain feature extraction unit 33 and the parameters of the source domain feature extraction unit 35 so that a distance calculated by the domain distance calculation unit 40 increases, that is, the feature extracted from the target domain training data and the feature extracted from the source domain training data are separated from each other.

Figure 5:
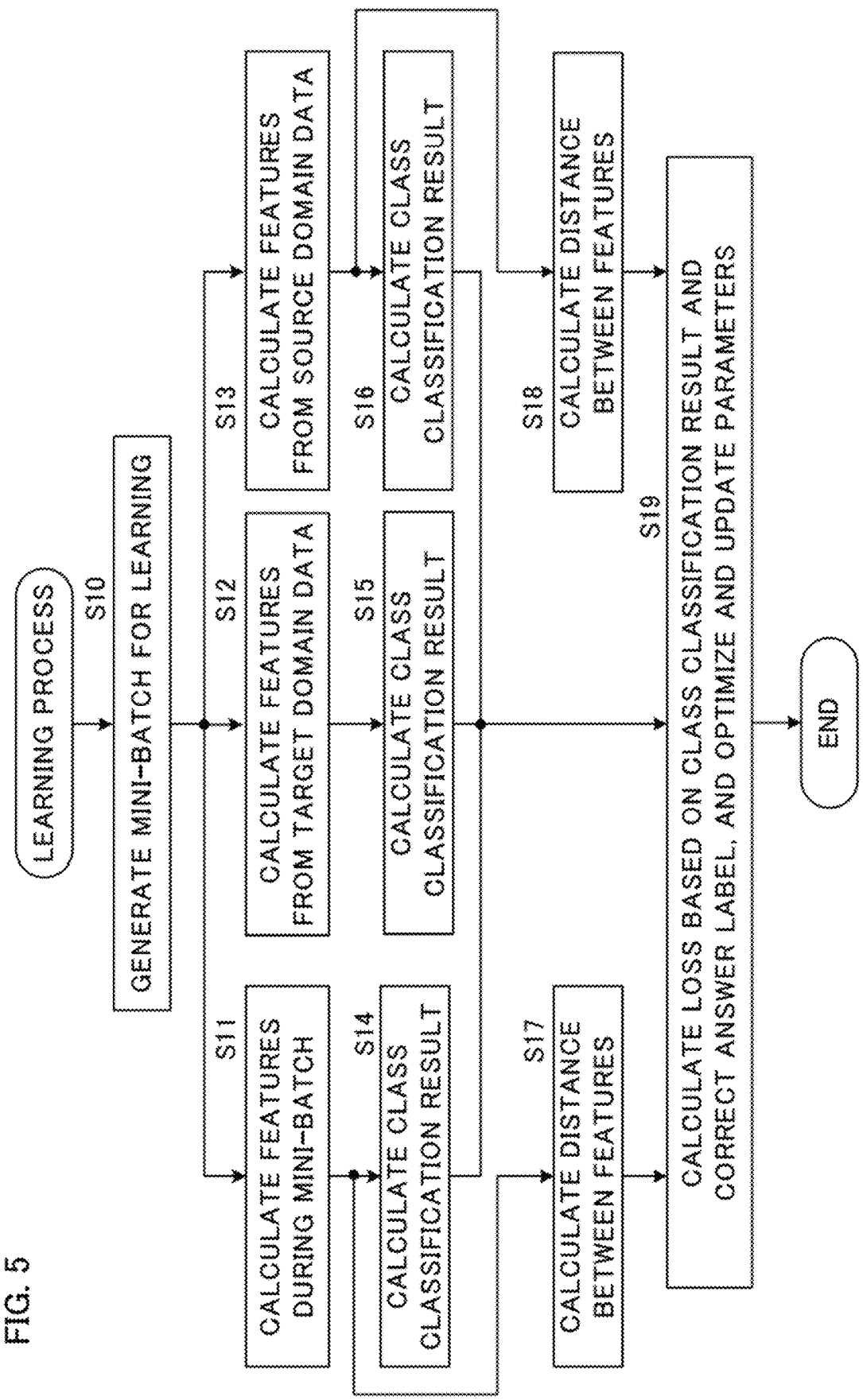
FIG. 5 is a flowchart of a learning process according to the first example embodiment.

Next, a learning process performed by the object recognition apparatus 110a will be described. FIG. 5 is a flowchart of the learning process executed by the object recognition apparatus 110a. This process is conducted by the processor 3, which is illustrated in FIG. 1, executes a program prepared in advance, and operate as each element depicted in FIG. 4. First, the training batch generation unit 32 generates a mini-batch from the training data stored in the training image DB 31 (step S10).

Next, the common feature extraction unit 34 extracts features from the target domain training data and the source domain training data during the mini-batch (step S11), the target domain feature extraction unit 33 extracts features from the target domain training data the mini-batch (step S12), and the source domain feature extraction unit 35 extracts features from the source domain training data during the mini-batch (step S13).

Next, the common feature identification unit 37 performs a class classification based on the features of the target domain training data and the source domain training data (step S14), the target domain feature identification unit 36 performs the class classification based on the features of the target domain training data (step S15), and the source domain feature identification unit 39 performs the class classification based on the features of the source domain training data (step S16).

Next, the domain distance calculation unit 38 calculates a distance between the features of the target domain training data output by the common feature extraction unit 34 and the features of the source domain training data (step S17). The domain distance calculation unit 40 calculates a distance between the features of the target domain training data output by the target domain feature extraction unit 33 and the features of the source domain training data output by the source domain feature extraction unit 35 (step S18). After that, the optimization unit 41 calculates a loss based on each class classification result and the correct answer label of the training data, and updates parameters of each feature extraction unit 33 to 35 and each feature identification unit 36, 37, and 39 so as to optimize the loss. Furthermore, the optimization unit 41 updates the parameters of each of the feature extraction units 33 to 35 so that the distance output by the domain distance calculating unit 38 is shorter and the distance output by the domain distance calculation unit 40 is longer (step S19). When a process of the mini-batch generated in step S10 is completed, the learning process is terminated.

(2) At a Time of Inference

Figure 6:
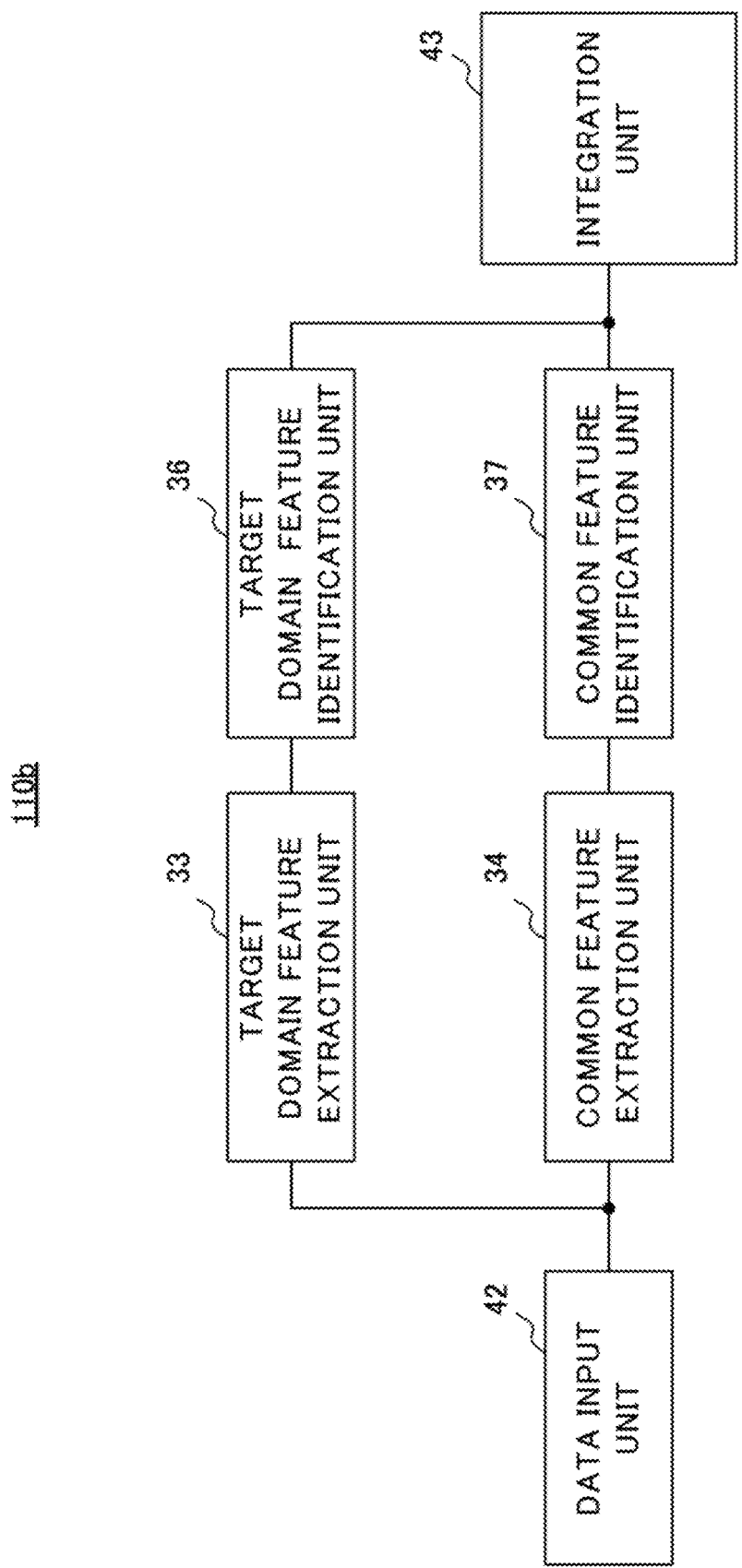
FIG. 6 illustrates a functional configuration of the object recognition apparatus at the time of inferring according to the first example embodiment.

FIG. 6 is a block diagram illustrating a functional configuration of an object recognition apparatus 110b at a time of inference according to an example embodiment of the first example embodiment. The object recognition apparatus 110b includes a data input unit 42 and an integration unit 43 in addition to the target domain feature extraction unit 33, the common feature extraction unit 34, the target domain feature identification unit 36, and the common feature identification unit 37, which have been trained through the learning process described above.

The data input unit 42 outputs the image data of the target domain to be inferred to the target domain feature extraction unit 33 and the common feature extraction unit 34. The target domain feature extraction unit 33 extracts a feature from the input image data and outputs the feature to the target domain feature identification unit 36. The target domain feature identification unit 36 performs the class classification based on the feature extracted by the target domain feature extraction unit 33 and outputs the class classification result to the integration unit 43. The common feature extraction unit 34 extracts a feature from the input image data and outputs the feature to the common feature identification unit 37. The common feature identification unit 37 performs the class classification based on the feature extracted by the common feature extraction unit 34 and outputs the class classification result to the integration unit 43. Note that each class classification result is output as vectors indicating values of confidence scores for respective classes (also referred to as "confidence score vectors").

The integration unit 43 generates a final recognition result based on the class classification results by the target domain feature identification unit 36 and the common feature identification unit 37. Here, in the first example embodiment, the target domain feature identification unit 36 outputs the class classification result for the (N-c) classes, and the common feature identification unit 37 outputs the class identification result for the N classes. As described, in a case where dimensions of the class classification results are different, it is not possible to simply calculate the two class classification results. Accordingly, in the first example embodiment, the integration unit 43 performs the following process.

As described above, the target domain network has high recognition accuracy for the (N-c) classes; however, cannot recognize the c classes. On the other hand, the common network can recognize all of N classes including the c classes with a certain degree of accuracy. In the example of the vehicle type recognition system described above, both the target domain network and the common network can recognize the (N-c) classes other than the new vehicle; however, the target domain network recognizes with more accuracy. On the other hand, although the target domain network cannot identify the c classes of the new vehicles, the common network can identify those with a certain degree of accuracy. Accordingly, the integration unit 43 infers whether the image data to be recognized belongs to the (N-c) classes or the c classes.

Specifically, the integration unit 43 compares the class classification result (hereinafter, referred to as "target domain classification result") by the target domain feature identification unit 36 with the class classification result (hereinafter, referred to as "common classification result") by the common feature identification unit 37. Here, in a case where the image data to be recognized belongs to the (N-c) classes, since both the target domain feature identification unit 36 and the common feature identification unit 37 can also performs recognition with a certain degree of accuracy, it is presumed that the same class is inferred to have the highest confidence score in the two class classification results. Also, in the two class classification results, the highest confidence score is both high, and it is inferred that a distance between those classes in a distance space indicating feature vectors is shorter. On the other hand, in a case where the image data to be recognized belongs to the c classes, since the target domain feature identification unit 36 basically cannot recognize that class, classes having the highest confidence score do not match in the two class classification results, and the recognition accuracy of that class by the common feature identification unit 37 increases. Therefore, the integration unit 43 determines the final recognition result in any one of the following methods.

(A) First Method

In a case where any of the following (a) to (d) applies, the integration unit 43 infers that the image data to be recognized belongs to the (N-c) classes, and sets the target domain classification result as the final recognition result.

(a) By the target domain classification result and the common classification result, the same class is output with the highest confidence score, and the highest confidence scores of the target domain classification result and the common classification result are equal to or greater than a first threshold value.

(b) By the target domain classification result and the common classification result, the same class is output with the highest confidence score, and a distance between a distribution of the target domain classification result and a distribution of the common classification result is equal to or less than a second threshold value.

(c) Confidence scores of the c classes in the common classification result are equal to or less than a third threshold value, and the highest confidence scores of the target domain classification result and the common classification result are equal to or greater than the first threshold value.

(d) The confidence scores of the c classes in the common classification result are equal to or less than the third threshold value and the distance between the distribution of the target domain classification result and the distribution of the common classification result is equal to or less than the second threshold value.

On the other hand, in a case where any one of the above-mentioned (a) to (d) is not applied, the integration unit 43 infers that the image data to be recognized belongs to the c classes, and sets the common classification result as the final recognition result.

(B) Second Method

As another method, in a case where the confidence scores of the c classes in the common classification result are higher than a predetermined threshold value, the integration unit 43 infers that the image data to be recognized belongs to the c classes, and sets the common classification result as the final recognition result. In other cases, the integration unit 43 sets the target domain classification result as the final recognition result.

By any of the above methods, the integration unit 43 can determine the final recognition result based on the two class classification results having different dimensions.

Figure 7:
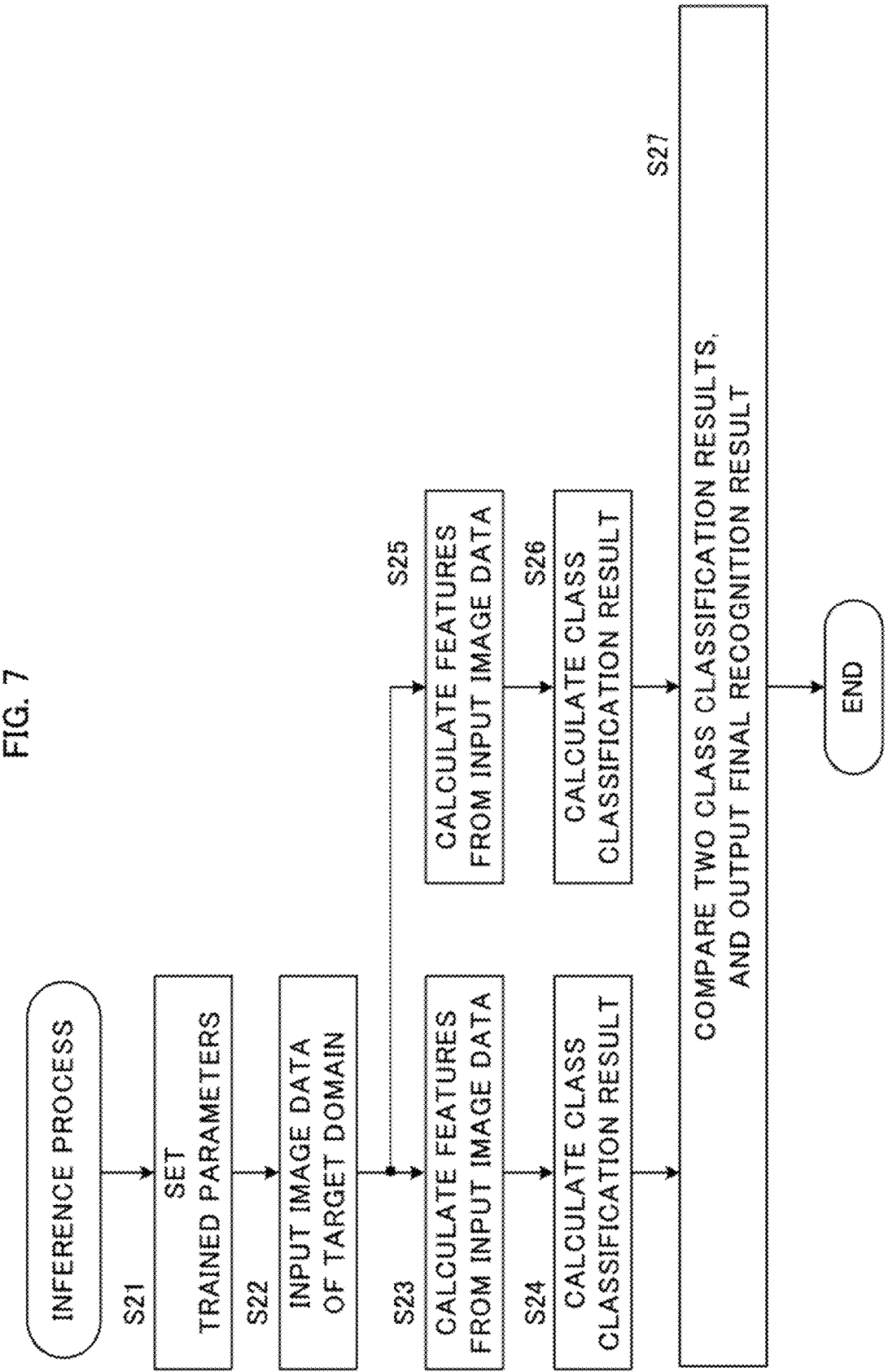
FIG. 7 is a flowchart of an inference process according to the first example embodiment.

Next, an inference process (object recognition process) by the object recognition apparatus 110b will be described. FIG. 7 is a flowchart of the inference process executed by the object recognition apparatus 110b. This process is conducted by the processor 3 which is illustrated in FIG. 1, executes a program prepared in advance and operates as each element depicted in FIG. 6. First, values updated by the learning process are set to parameters of the target domain feature extraction unit 33, the common feature extraction unit 34, the target domain feature identification unit 36, and the common feature identification unit 37 (step S21).

Next, the data input unit 42 inputs the image data of the target domain to be recognized to the target domain feature extraction unit 33 and the common feature extraction unit 34 (step S22). The common feature extraction unit 34 extracts features from the input image data (step S23), and the common feature identification unit 37 performs the class classification based on the extracted features and outputs a result to the integration unit 43 (step S24). Also, the target domain feature extraction unit 33 extracts features from the input image data (step S25), and the target domain feature identification unit 36 performs the class classification based on the extracted features and outputs a result to the integration unit 43 (step S26). After that, the integration unit 43 outputs a final recognition result based on the two class classification results by the first or second method described above (step S27).

Second Example Embodiment

Next, a second example embodiment in the present disclosure will be described.

(Basic Algorithm)

Figure 8:
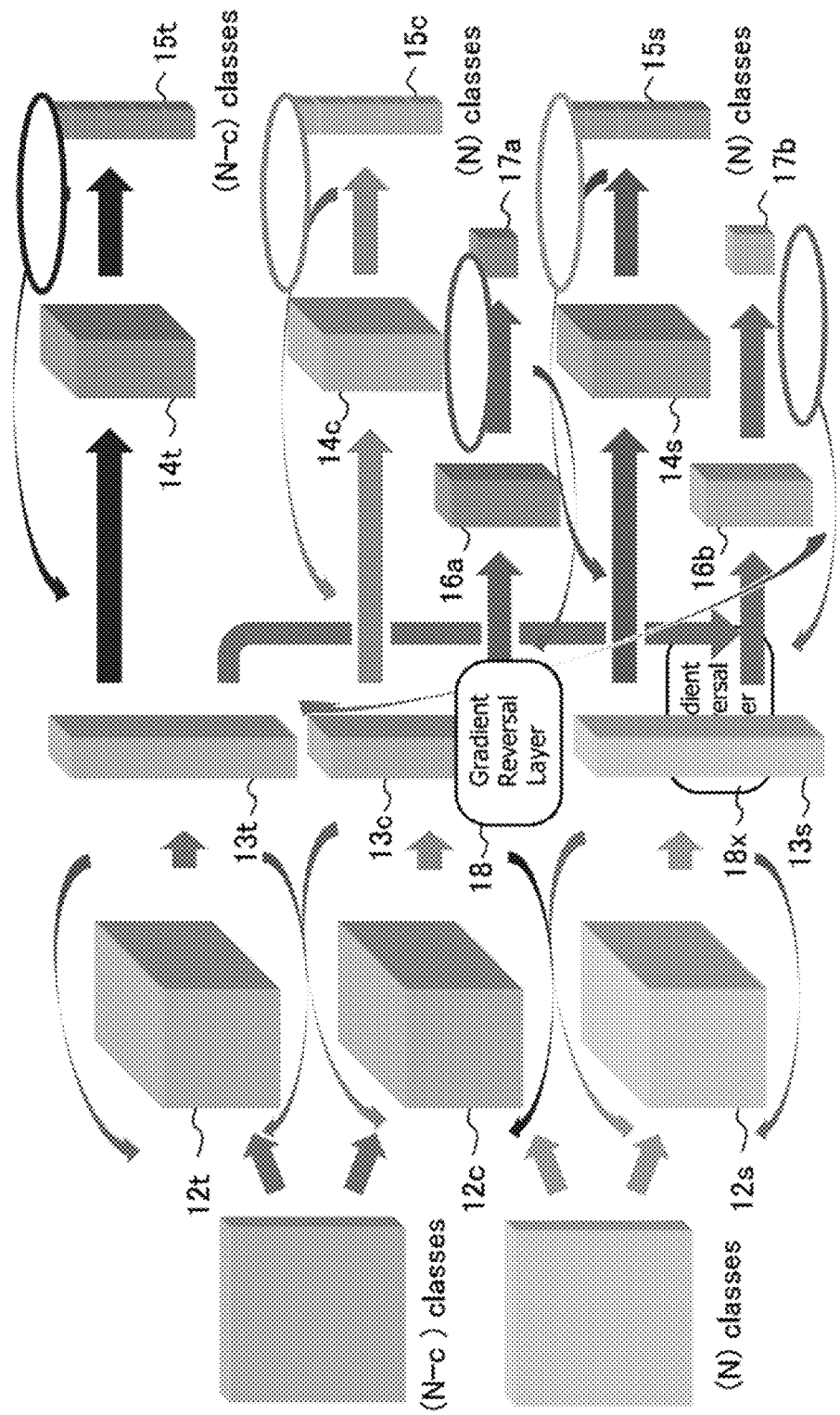
FIG. 8 schematically illustrates a basic algorithm at a time of learning according to a second example embodiment.

First, a basic algorithm for learning will be described. FIG. 8 is a diagram schematically illustrating the basic algorithm at the time of learning according to the second example embodiment. An object recognition apparatus 200a at the time of learning basically includes the same configuration as that of the object recognition apparatus 100a in the first example embodiment illustrated in FIG. 2. However, in the object recognition apparatus 200a according to the second example embodiment, the loss Lb generated based on a domain identification result 17b outputted by the domain identifier 16b is backpropagated to the feature extractors 12t and 12s through a GRL 18x. By this backpropagation, the feature extractors 12t and 12s are trained to absorb a difference between the target domain and the source domain.

Figure 9:
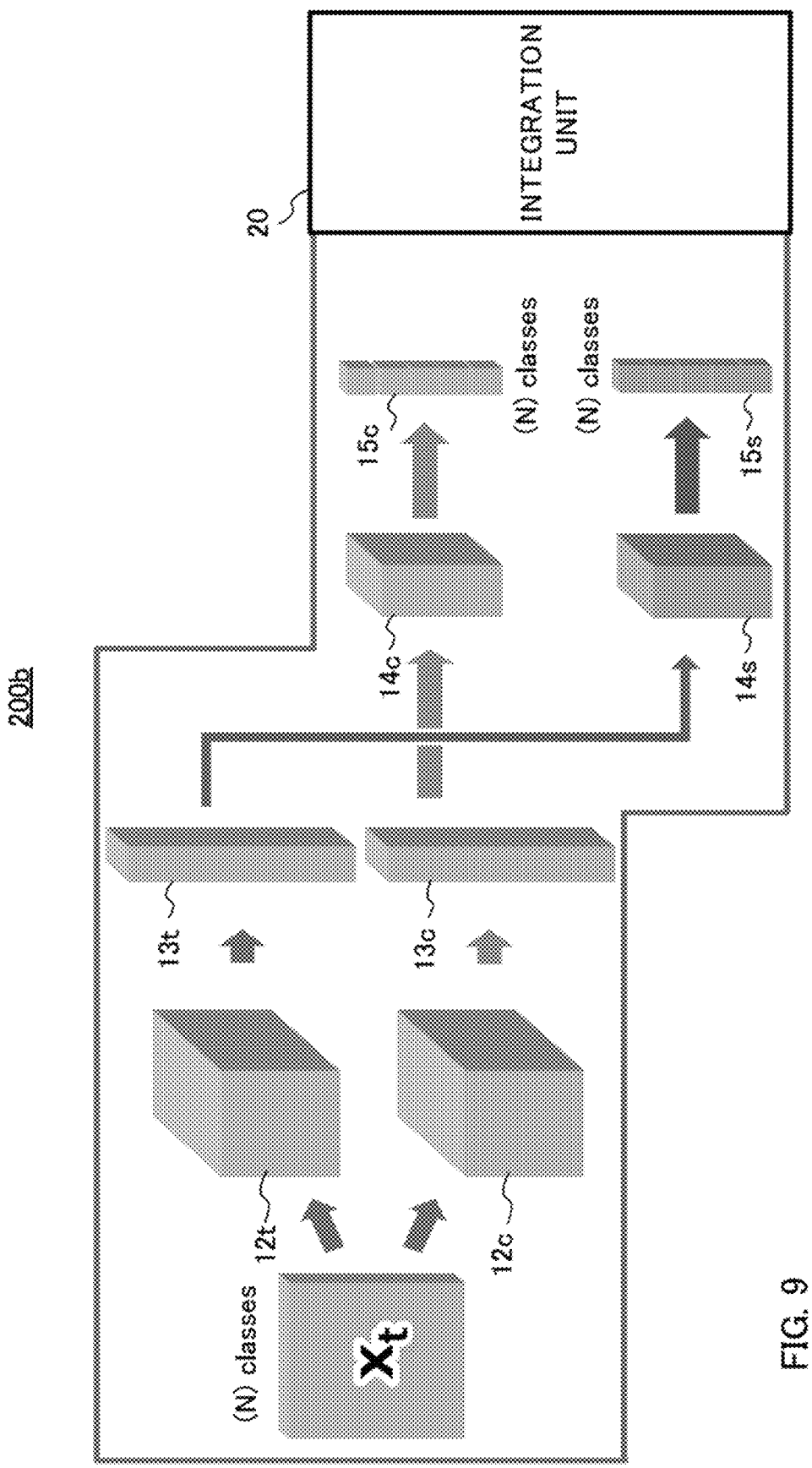
FIG. 9 schematically illustrates a basic algorithm at a time of inferring according to the second example embodiment.

Next, the basic algorithm at the time of inference will be described. FIG. 9 is a diagram schematically illustrating a basic algorithm at the time of inference according to the second example embodiment. An object recognition apparatus 200b at the time of inference uses the feature extractors 12t and 12c and the class classifiers 14c and 14s in the configuration of the object recognition apparatus 200a at the time of learning depicted in FIG. 8. That is, the object recognition apparatus 200b at the time of inference includes the learned feature extractors 12t and 12c, the learned class classifiers 14c and 14s, and the integration unit 20.

At the time of inference, the target domain image data Xt in the N classes are input as the image data to be actually recognized. In the example of the vehicle type recognition system described above, live image data in the N classes including the c classes of the new vehicles are input. The feature extractor 12t extracts the features 13t from the input image data, and the class classifier 14s outputs the identification result 15s for the N classes from the features 13t. The feature extractor 12c extracts the common features 13c from the input image data, and the class classifier 14c outputs the identification result 15c for the N classes from the common features 13c. After that, the integration unit 20 outputs a final recognition result based on the identification result 15c for the N classes and the identification result 15s for the N classes.

Examples

Next, a specific example embodiment of the object recognition apparatus according to the second example embodiment will be described.

(1) At a Time of Learning

The object recognition apparatus at a time of learning according to an example of the second example embodiment includes basically the same configuration as that of the object recognition apparatus 110a in the first example embodiment illustrated in FIG. 4. However, in the second example embodiment, the optimization unit 41 updates parameters of the target domain feature extraction unit 33 and the source domain feature extraction unit 35 so that a distance calculated by the domain distance calculation unit 40 becomes shorter, that is, the feature extracted from the target domain training data and the feature extracted from the source domain training data approach each other.

Next, a learning process performed by the object recognition apparatus according to the second example embodiment will be described. The learning process by the object recognition apparatus of the second example embodiment is basically the same as the learning process of the first example embodiment illustrated in FIG. 5. However, in the second example embodiment, in step S19 illustrated in FIG. 5, the optimization unit 41 updates parameters of the target domain feature extraction unit 33 and the source domain feature extraction unit 35 so that a distance output by the domain distance calculation unit 40 becomes shorter.

(2) At a Time of Inference

Figure 10:
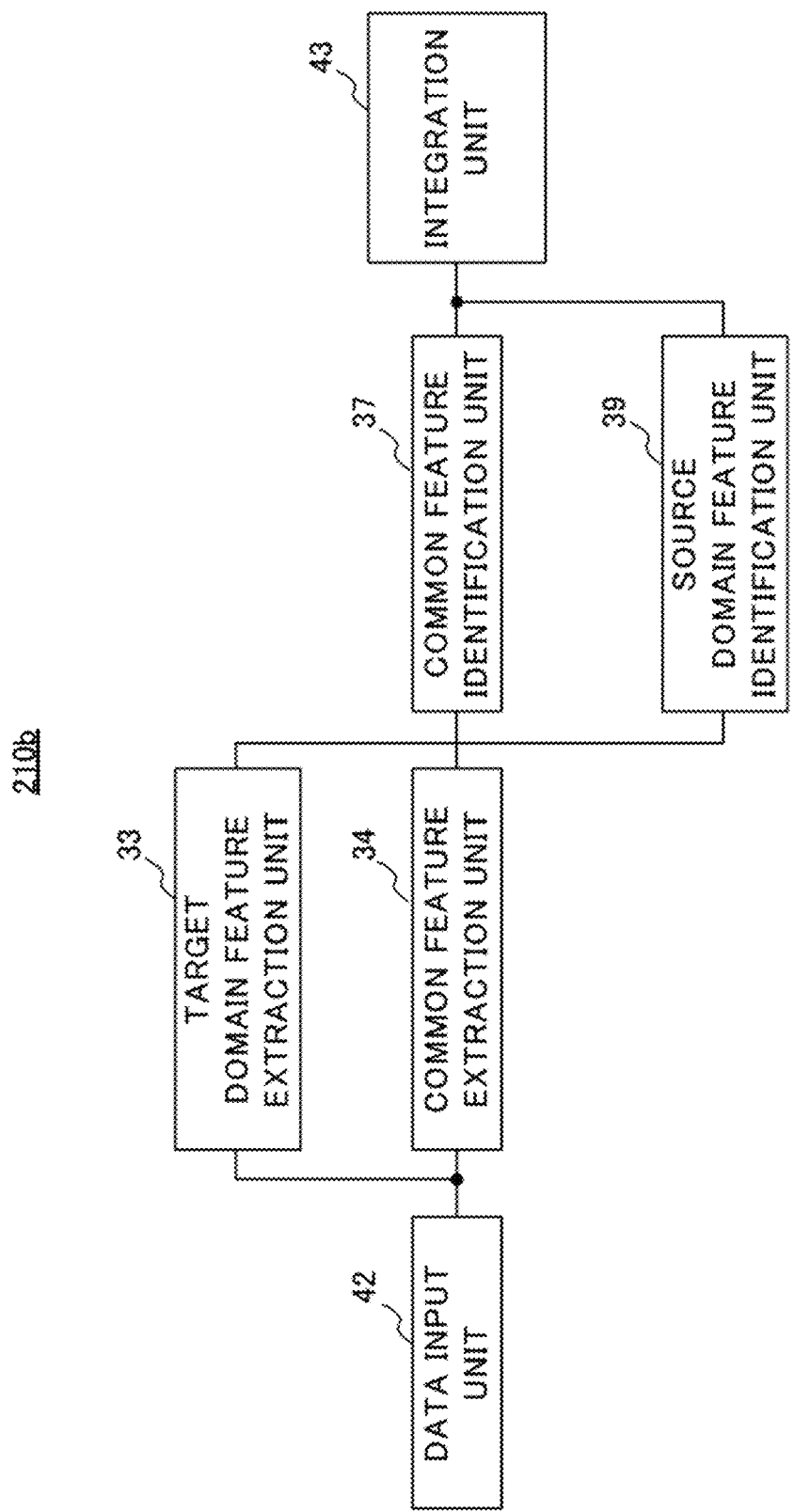
FIG. 10 illustrates a functional configuration of an object recognition apparatus at the time of inferring according to the second example embodiment.

FIG. 10 is a block diagram illustrating a functional configuration of an object recognition apparatus 210b at a time of inference according to an example embodiment of the second example embodiment. The object recognition apparatus 210b includes the data input unit 42 and the integration unit 43 in addition to the target domain feature extraction unit 33, the common feature extraction unit 34, the common feature identification unit 37, and the source domain feature identification unit 39, which have been trained through the learning process described above.

The data input unit 42 outputs image data of the target domain to be recognized to the target domain feature extraction unit 33 and the common feature extraction unit 34. The target domain characteristic extraction unit 33 extracts the feature from the input image data and outputs the extracted feature to the source domain feature identification unit 39. The source domain feature identification unit 39 performs the class classification based on the features extracted by the target domain feature extraction unit 33 and outputs a class classification result to the integration unit 43. The common feature extraction unit 34 extracts features from the input image data and outputs the features to the common feature identification unit 37. The common characteristic identification unit 37 performs the class classification based on the features extracted by the common feature extraction unit 34 and outputs a class classification result to the integration unit 43.

The integration unit 43 generates a final recognition result based on the class classification results by the common feature identification unit 37 and the source domain feature identification unit 39. In the second example embodiment, both the common feature identification unit 37 and the source domain feature identification unit 39 output the class classification results for the N classes. Since dimensions of the class classification results are matched to each other, the integration unit 43 may simply calculate the two class classification results. Specifically, the integration unit 43 adds confidence scores in the two class classification results for each class, and sets a class in which a sum of the confidence scores becomes the highest, as the final recognition result.

Figure 11:
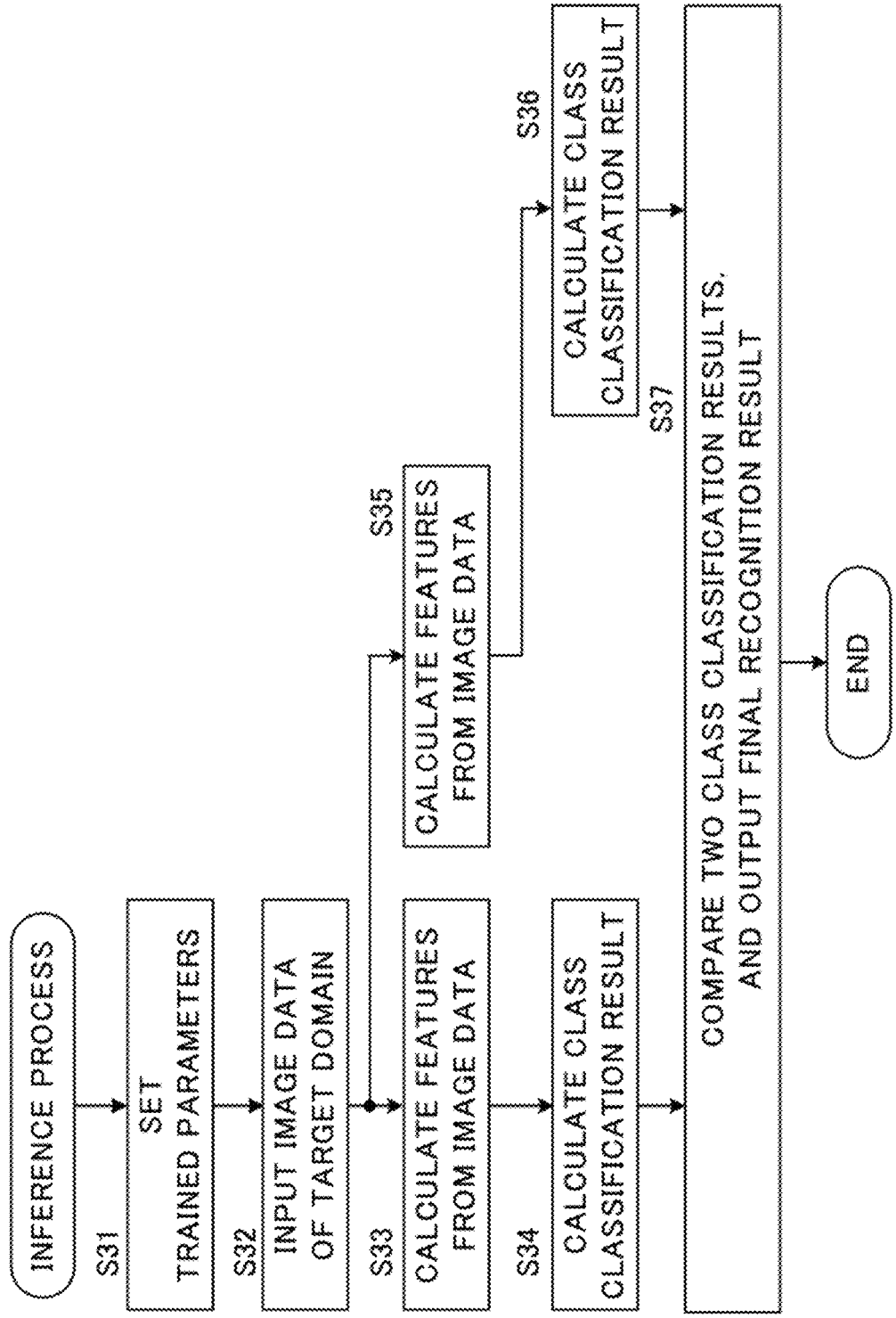
FIG. 11 is a flowchart of an inference process according to the second example embodiment.

Next, an inference process (object recognition process) by the object recognition apparatus 210b will be described. FIG. 11 is a flowchart of the inference process executed by the object recognition apparatus 210b. This process is conducted by the processor 3, which is illustrated in FIG. 1, executes a program prepared in advance, and operate as each element depicted in FIG. 10. First, values updated by the learning process are set to parameters of the target domain feature extraction unit 33, the common feature extraction unit 34, the common feature identification unit 37, and the source domain feature identification unit 39 (step S31).

Next, the data input unit 42 inputs image data of the target domain to be recognized to the target domain feature extraction unit 33 and the common feature extraction unit 34 (step S32). The common feature extraction unit 34 extracts features from the input image data (step S33), and the common feature identification unit 37 performs a class classification based on the extracted features and outputs a class classification result to the integration unit 43 (step S34). Moreover, the target domain feature extraction unit 33 extracts features from the input image data (step S35), and the source domain feature identification unit 39 performs the class classification based on the extracted features and outputs a class classification result to the integration unit 43 (step S36). After that, the integration unit 43 outputs a final recognition result based on the two class classification results by the method described above (step S37).

Third Example Embodiment

Next, a third example embodiment in the present disclosure will be described.

(Basic Algorithm)

Since a basic algorithm at the time of learning of the object recognition apparatus 10 according to the third example embodiment is the same as that of the object recognition apparatus 200a according to the second example embodiment shown in FIG. 8, illustration and description thereof are omitted.

Figure 12:
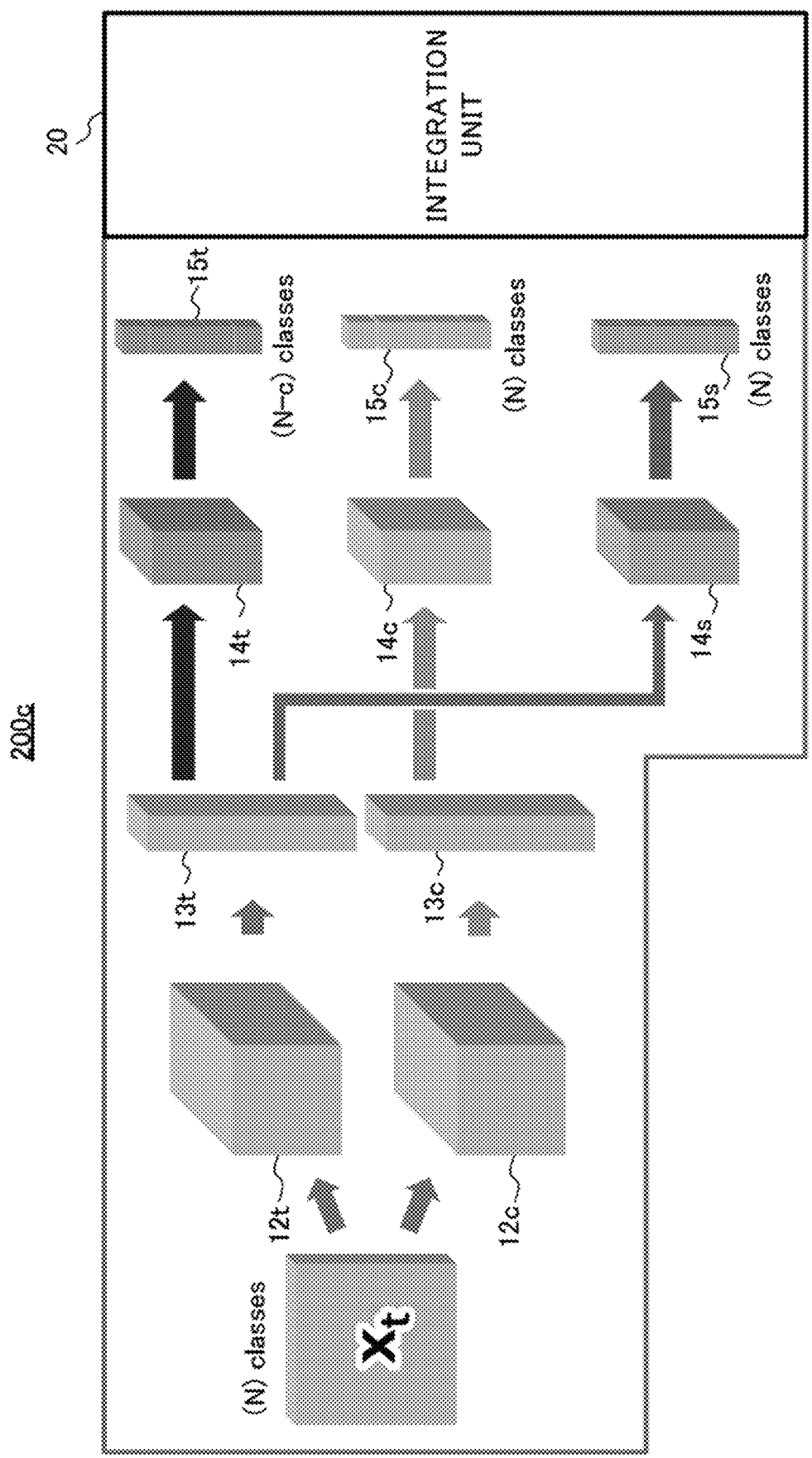
FIG. 12 schematically illustrates a basic algorithm at a time of inferring according to a third example embodiment.

Next, the basic algorithm at the time of inference will be described. FIG. 12 is a diagram schematically illustrating the basic algorithm at the time of inference according to the third example embodiment. An object recognition apparatus 200c at the time of inference uses the feature extractors 12t and 12c and the class classifiers 14t, 14c, and 14s in the configuration of the object recognition apparatus 200a at the time of learning depicted in FIG. 8. That is, the object recognition apparatus 200c at the time of inference includes the trained feature extractor 12t, 12c, the trained class classifier 14t, 14c, 14s, and the integration unit 20.

At the time of inference, the target domain image data Xt in the N classes are input as image data to be actually recognized. In the example of the vehicle type recognition system described above, live image data in the N classes including the c classes of the new vehicles are input. The feature extractor 12t extracts the features 13t from the input image data and outputs the features to the class classifiers 14t and 14s. The classifier 14t outputs the identification result 15t for the (N-c) classes from the extracted features 13t. The classifier 14s outputs the identification result 15s for the N classes from the extracted features 13t. Moreover, the feature extractor 12c extracts the features 13c from the input image data, and the class classifier 14c outputs the identification result 15c for the N classes from the features 13c. After that, the integration unit 20 outputs a final recognition result based on the identification result 15t for the (N-c) classes, the identification result 15c for the N classes, and the identification result 15s for the N classes.

Examples

Next, a specific example of the object recognition apparatus according to the third example embodiment will be described.

(1) At a Time of Learning Since the object recognition apparatus at a time of learning according to an example of the third example embodiment is the same as that of the object recognition apparatus of the second example embodiment, illustration and description thereof will be omitted.

(2) At a Time of Inference

Figure 13:
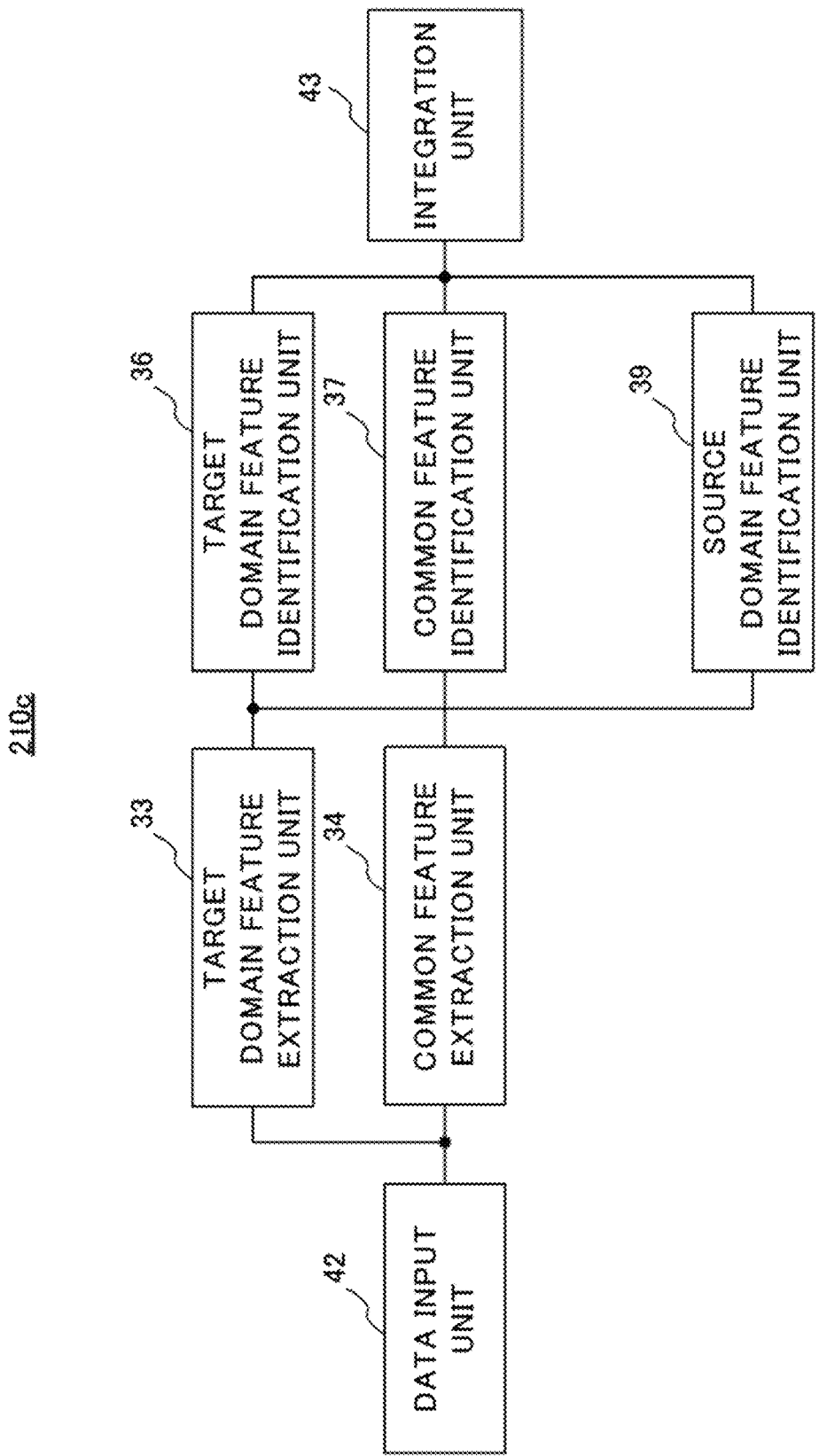
FIG. 13 illustrates a functional configuration of an object recognition apparatus at the time of inferring according to the third example embodiment.

FIG. 13 is a block diagram illustrating a functional configuration of an object recognition apparatus 210c at a time of inference according to an example of the third example embodiment. The object recognition apparatus 210c includes the data input unit 42 and the integration unit 43 in addition to the target domain feature extraction unit 33, the common feature extraction unit 34, the target domain feature identification unit 36, the common feature identification unit 37, and the source domain feature identification unit 39, which have been trained by the learning process.

The data input unit 42 outputs the image data of the target domain to be recognized to the target domain feature extraction unit 33 and the common feature extraction unit 34. The target domain feature extraction unit 33 extracts features from the input image data, and outputs the extracted features to the target domain feature identification unit 36 and the source domain feature identification unit 39. Each of the target domain feature identification unit 36 and the source domain feature identification unit 39 performs a class classification based on the features extracted by the target domain feature extraction unit 33, and outputs the class classification result to the integration unit 43. The common feature extraction unit 34 extracts features from the input image data, and outputs the features to the common feature identification unit 37. The common characteristic identification unit 37 performs the class classification based on the features extracted by the common feature extraction unit 34, and outputs a class classification result to the integration unit 43.

The integration unit 43 generates a final recognition result based on respective class classification results by the target domain feature identification unit 36, the common feature identification unit 37, and the source domain feature identification unit 39. In the third example embodiment, the target domain feature identification unit 36 outputs the class classification result of the (N-c) classes, and each of the common feature identification unit 37 and the source domain feature identification unit 39 outputs the class classification result of the N classes. Therefore, the integration unit 43 determines the final recognition result by combining the techniques of the first example embodiment and the second example embodiment.

Specifically, in accordance with the method of the second example embodiment, the integration unit 43 determines a class having the highest confidence score as a recognition result based on the common classification result of the N classes by the common feature identification unit 37 and the class classification result of the N classes (referred to as the "source domain classification result") by the source domain feature identification unit 39. This recognition result corresponds to a "non-target domain classification result". Next, the integration unit 43 determines the final recognition result by the first or second method using the recognition result as the "common classification result" in the first example embodiment. Accordingly, the final recognition result can be determined from the target domain classification result of the (N-c) classes, the common classification result of the N classes, and the source domain classification result of the N classes.

Figure 14:
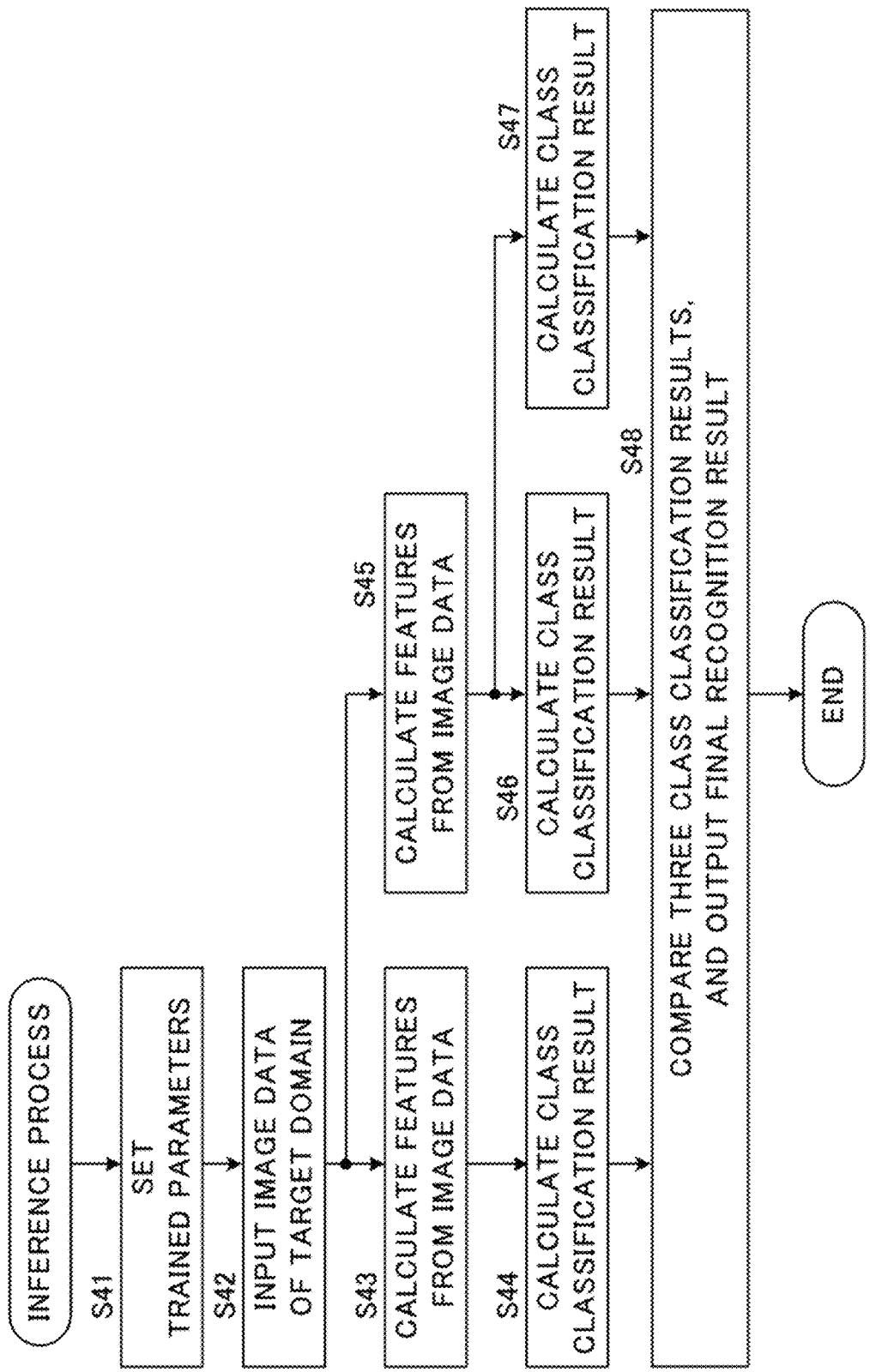
FIG. 14 is a flowchart of an inference process according to the third example embodiment.

Next, the inference process (object recognition process) by the object recognition apparatus 210c will be described. FIG. 14 is a flowchart of the inference process executed by the object recognition apparatus 210c. This process is conducted by the processor 3, which is illustrated in FIG. 1, executes a program prepared in advance, and operates as each element depicted in FIG. 13. First, values updated by the learning process are set to parameters of the target domain feature extraction unit 33, the common feature extraction unit 34, the target domain feature identification unit 36, the common feature identification unit 37, and the source domain feature identification unit 39 (step S41).

Next, the data input unit 42 inputs image data of the target domain to be recognized to the target domain feature extraction unit 33 and the common feature extraction unit 34 (step S42). The common feature extraction unit 34 extracts features from the input image data (step S43), and the common feature identification unit 37 performs a class classification based on the extracted features, and outputs a class classification result to the integration unit 43 (step S44). Moreover, the target domain feature extraction unit 33 extracts features from the input image data (step S45). The target domain feature identification unit 36 performs the class classification based on the features extracted by the target domain feature extraction unit 33, and outputs a class classification result to the integration unit 43 (step S46). Furthermore, the source domain feature identification unit 39 performs the class classification based on the features extracted by the target domain feature extraction unit 33, and outputs a class classification result to the integration unit 43 (step S47). Accordingly, the integration unit 43 outputs a final recognition result from three class classification results by the methods described above (step S48).

Fourth Example Embodiment

Figure 15:
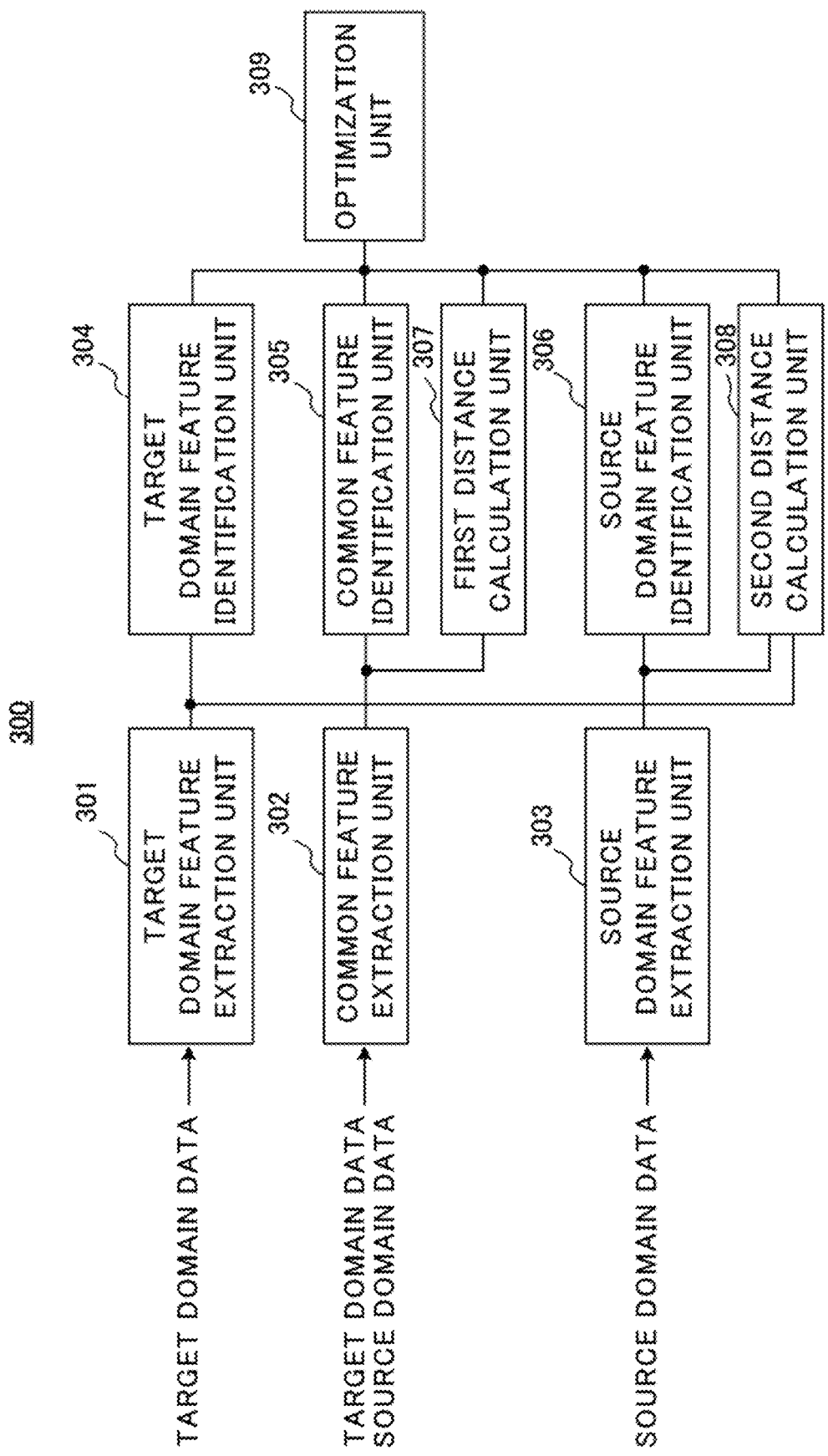
FIG. 15 illustrates a functional configuration of an object recognition apparatus at the time of inferring according to a fourth example embodiment.

Next, a fourth example embodiment of the present disclosure will be described. FIG. 15 is a block diagram illustrating a functional configuration of an learning apparatus 300 according to the fourth example embodiment. The learning apparatus 300 is realized by a hardware configuration illustrated in FIG. 1. The learning apparatus 300 includes a target domain feature extraction unit 301, a common feature extraction unit 302, a source domain feature extraction unit 303, a target domain feature identification unit 304, a common feature identification unit 305, a source domain feature identification unit 306, a first distance calculation unit 307, a second distance calculation unit 308, and an optimization unit 309.

The target domain feature extraction unit 301 extracts unique features of target domain data. The target domain feature identification unit 304 classifies the target domain data into the (N-c) classes based on the unique features of the target domain data. The source domain feature extraction unit 303 extracts unique features of source domain data. The source domain feature identification unit 306 classifies the source domain data into the N classes based on the unique features of the source domain data. The common feature extraction unit 302 extracts common features of the target domain data and common features of the source domain data. The common feature identification unit 305 classifies the target domain data and the source domain data into the N classes based on the common features of the target domain data and the common features of the source domain data.

The first distance calculation unit 307 calculates a first distance between the common features of the target domain data and the common features of the source domain data. The second distance calculation unit 308 calculates a second distance between the unique features of the target domain data and the unique features of the source domain data. The optimization unit 309 updates parameters of the common feature extraction unit 302 based on the first distance, and updates parameters of the target domain feature extraction unit 301 and the source domain feature extraction unit 303 based on the second distance.

A part or all of the example embodiments described above may also be described as the following supplementary notes, but not limited thereto.

(Supplementary Note 1)

1. A learning apparatus comprising:
   a target domain feature extraction unit configured to extract unique features of target domain data;
   a target domain feature identification unit configured to classify the target domain data into (N-c) classes based on the unique features of the target domain data;
   a source domain feature extraction unit configured to extract unique features of source domain data;
   a source domain feature identification unit configured to classify the source domain data into N classes based on the unique features of the source domain data;

a common feature extraction unit configured to extract common features of the target domain data and common features of the source domain data;

a common feature identification unit configured to classify the target domain data and the source domain data into the N classes based on the common features of the target domain data and the common features of the source domain data;

a first distance calculation unit configured to calculate a first distance between the common features of the target domain data and the common features of the source domain data;

a second distance calculation unit configured to calculate a second distance between the unique features of the target domain data and the unique features of the source domain data; and an optimization unit configured to update parameters of the common feature extraction unit based on the first distance, and update parameters of the target domain feature extraction unit and the source domain feature extraction unit based on the second distance.

(Supplementary Note 2)

2. The learning apparatus according to supplementary note 1, wherein the optimization unit updates parameters of the target domain feature extraction unit and the source domain feature extraction unit in order for the second distance to be longer.

(Supplementary Note 3)

3. The learning apparatus according to supplementary note 1, wherein the optimization unit updates parameters of the target domain feature extraction unit and the source domain feature extraction unit in order for the second distance to be shorter.

(Supplementary Note 4)

4. The learning apparatus according to supplementary notes 1 through 3, wherein the optimization unit updates parameters of the common feature extraction unit in order for the first distance to be shorter.

(Supplementary Note 5)

5. An inference apparatus comprising:

a target domain feature extraction unit and a common feature extraction unit, to each of which parameters updated by the learning apparatus according to supplementary note 1 are set, each configured to extract features of input data;

a target domain feature identification unit configured to classify the input data into the (N-c) classes based on the features extracted by the target domain feature extraction unit, and output a target domain classification result;

a common feature identification unit configured to classify the input data into the N classes based on the feature extracted by the common feature extraction unit, and output a common classification result; and an integration unit configured to integrate the target domain classification result and the common classification result, and output a final result.

(Supplementary Note 6)

6. The inference apparatus according to supplementary note 5, wherein the integration unit outputs the target domain classification result as the final result in a case of corresponding either one of cases (a) through (d), and outputs the common classification result as the final result in a case of not corresponding to any of the cases (a) through (d):

(a) by the target domain classification result and the common classification result, the same class is output with the highest confidence score, and the highest confidence scores of the target domain classification result and the common classification result are equal to or greater than a first threshold value, (b) by the target domain classification result and the common classification result, the same class is output with the highest confidence score, and a distance between a distribution of the target domain classification result and a distribution of the common classification result is equal to or less than a second threshold value, (c) confidence scores of c classes in the common classification result are equal to or less than a third threshold value, and the highest confidence scores of the target domain classification result and the common classification result are equal to or greater than the first threshold value, and (d) the confidence scores of the c classes in the common classification result are equal to or less than the third threshold value and the distance between the distribution of the target domain classification result and the distribution of the common classification result is equal to or less than the second threshold value.

(Supplementary Note 7)

7. The inference apparatus according to supplementary note 5, wherein the integration unit outputs the common classification result as the final result in a case where confidence scores of the c classes in the common classification result are equal to or greater than a fourth threshold value, and outputs the target domain classification result as the final result in other cases.

(Supplementary Note 8)

8. An inference apparatus comprising a target domain feature extraction unit and a common feature extraction unit, to each of which parameters updated by the learning apparatus according to supplementary note 1 are set, each configured to extract features of input data;

a source domain feature identification unit configured to classify the input data into the N classes based on the features extracted by the target domain feature extraction unit, and output a source domain classification result;

a common feature identification unit configured to classify the input data into the N classes based on the feature extracted by the common feature extraction unit, and output a common classification result; and an integration unit configured to integrate the source domain classification result and the common classification result, and output a final result.

(Supplementary Note 9)

9. The inference apparatus according to supplementary note 8, wherein the integration unit calculates a sum of confidence scores of the source domain classification result and the common classification result for each of the N classes, and outputs a class, in which the sum is highest, as the final result.

(Supplementary Note 10)

10. An inference apparatus comprising a target domain feature extraction unit and a common feature extraction unit, to each of which parameters updated by the learning apparatus according to supplementary note 1 are set, each configured to extract features of input data;

a target domain feature identification unit configured to classify the input data into the (N-c) classes based on the features extracted by the target domain feature extraction unit, and output a target domain classification result;

a common feature identification unit configured to classify the input data into the N classes based on the features extracted by the common feature extraction unit, and output a common classification result;

a source domain feature identification unit configured to classify the input data into the N classes based on the features extracted by the target domain feature extraction unit, and output a source domain classification result; and an integration unit configured to integrate the target domain classification result, the common classification result, and the source domain classification result, and output a final result.

(Supplementary Note 11)

11. The inference apparatus according to supplementary note 10, wherein the integration unit calculates a sum of confidence scores of the source domain classification result and the common classification result for each class, and sets a class having the highest sum as a non-target domain classification result, and the integration unit further outputs the target domain classification result as the final result in a case of corresponding either one of cases (a) through (d), and outputs the non-target domain classification result as the final result in a case of not corresponding to any of the cases (a) through (d):

(a) by the target domain classification result and the non-target domain classification result, the same class is output with the highest confidence score, and the highest confidence scores of the target domain classification result and the non-target domain classification result are equal to or greater than a first threshold value, (b) by the target domain classification result and the non-target domain classification result, the same class is output with the highest confidence score, and a distance between a distribution of the target domain classification result and a distribution of the non-target domain classification result is equal to or less than a second threshold value, (c) confidence scores of c classes in the non-target domain classification result are equal to or less than a third threshold value, and the highest confidence scores of the target domain classification result and the non-target domain classification result are equal to or greater than the first threshold value, and (d) the confidence scores of the c classes in the non-target domain classification result are equal to or less than the third threshold value, and the distance between the distribution of the target domain classification result and the distribution of the non-target domain classification result is equal to or less than the second threshold value.

(Supplementary Note 12)

12. The inference apparatus according to supplementary note 10, wherein the integration unit calculates a sum of confidence scores of the source domain classification result and the common classification result for each of the N classes, and sets a class having the highest sum as a non-target domain classification result, outputs the non-target domain classification result as the final result in a case where respective confidence scores of n classes in the non-target domain classification result are equal to or greater than a fourth threshold value, and outputs the target domain classification result as the final result in other cases.

(Supplementary Note 13)

13. A learning method comprising:

extracting unique features of target domain data by a target domain feature extraction unit;

classifying the target domain data into (N-c) classes based on the unique features of the target domain data;

extracting unique features of source domain data by a source domain feature extraction unit;

classifying the source domain data into N classes based on the unique features of the source domain data;

extracting common features of the target domain data and common features of the source domain data by a common feature extraction unit;

classifying the target domain data and the source domain data into the N classes based on the common features of the target domain data and the common features of the source domain data;

calculating a first distance between the common features of the target domain data and the common features of the source domain data;

calculating a second distance between the unique features of the target domain data and the unique features of the source domain data; and updating parameters of the common feature extraction unit based on the first distance, and updating parameters of the target domain feature extraction unit and the source domain feature extraction unit based on the second distance.

(Supplementary Note 14)

14. A recording medium storing a program, the program causing a computer to perform a process comprising:

extracting unique features of target domain data by a target domain feature extraction unit;

classifying the target domain data into (N-c) classes based on the unique features of the target domain data;

extracting unique features of source domain data by a source domain feature extraction unit;

classifying the source domain data into N classes based on the unique features of the source domain data;

extracting common features of the target domain data and common features of the source domain data by a common feature extraction unit;

classifying the target domain data and the source domain data into the N classes based on the common features of the target domain data and the common features of the source domain data;

calculating a first distance between the common features of the target domain data and the common features of the source domain data;

calculating a second distance between the unique features of the target domain data and the unique features of the source domain data; and updating parameters of the common feature extraction unit based on the first distance, and updating parameters of the target domain feature extraction unit and the source domain feature extraction unit based on the second distance.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS

10 Object recognition apparatus
33 Target domain feature extraction unit
34 Common feature extraction unit
35 Source domain feature extraction unit
36 Target domain feature identification unit
37 Common feature identification unit
38, 40 Domain distance calculation unit
39 Source distance calculation unit
41 Optimization unit
43 Integration unit
110a, 300 Learning apparatus
110b, 210b, 210c Inference apparatus

What is claimed is:

1. A learning apparatus comprising:
a first memory storing instructions; and
one or more first processors configured to execute the instructions to:
extract unique features of target domain data by operating as a target domain feature extraction unit;
classify the target domain data into (N-c) classes based on the unique features of the target domain data;
extract unique features of source domain data by operating as a source domain feature extraction unit;
classify the source domain data into N classes based on the unique features of the source domain data;
extract common features of the target domain data and common features of the source domain data by operating as a common feature extraction unit;
classify the target domain data and the source domain data into the N classes based on the common features of the target domain data and the common features of the source domain data;
calculate a first distance between the common features of the target domain data and the common features of the source domain data;
calculate a second distance between the unique features of the target domain data and the unique features of the source domain data; and
update parameters of the common feature extraction unit based on the first distance, and update parameters of the target domain feature extraction unit and the source domain feature extraction unit based on the second distance.

2. The learning apparatus according to claim 1, wherein the first processor updates parameters of the target domain feature extraction unit and the source domain feature extraction unit in order for the second distance to be longer.

3. The learning apparatus according to claim 1, wherein the first processor updates parameters of the target domain feature extraction unit and the source domain feature extraction unit in order for the second distance to be shorter.

4. The learning apparatus according to claims 1 through 3, wherein the first processor updates parameters of the common feature extraction unit in order for the first distance to be shorter.

5. An inference apparatus comprising:
a second memory storing instructions; and
one or more second processors configured to execute the instructions to:
extract features of input data by operating as each of a target domain feature extraction unit and a common feature extraction unit, to each of which parameters updated by the learning apparatus according to claim 1 are set;
classify the input data into the (N-c) classes based on the features extracted by the target domain feature extraction unit, and output a target domain classification result;
classify the input data into the N classes based on the feature extracted by the common feature extraction unit, and output a common classification result; and
integrate the target domain classification result and the common classification result, and output a final result.

6. The inference apparatus according to claim 5, wherein the second processor outputs the target domain classification result as the final result in a case of corresponding either one of cases (a) through (d), and outputs the common classification result as the final result in a case of not corresponding to any of the cases (a) through (d):

(a) by the target domain classification result and the common classification result, the same class is output with the highest confidence score, and the highest confidence scores of the target domain classification result and the common classification result are equal to or greater than a first threshold value, (b) by the target domain classification result and the common classification result, the same class is output with the highest confidence score, and a distance between a distribution of the target domain classification result and a distribution of the common classification result is equal to or less than a second threshold value, (c) confidence scores of c classes in the common classification result are equal to or less than a third threshold value, and the highest confidence scores of the target domain classification result and the common classification result are equal to or greater than the first threshold value, and (d) the confidence scores of the c classes in the common classification result are equal to or less than the third threshold value and the distance between the distribution of the target domain classification result and the distribution of the common classification result is equal to or less than the second threshold value.

7. The inference apparatus according to claim 5, wherein the second processor outputs the common classification result as the final result in a case where confidence scores of the c classes in the common classification result are equal to or greater than a fourth threshold value, and outputs the target domain classification result as the final result in other cases.

8. An inference apparatus comprising a third memory storing instructions; and
one or more third processors configured to execute the instructions to:
extract features of input data by operating as each of a target domain feature extraction unit and a common feature extraction unit, to each of which parameters updated by the learning apparatus according to claim 1 are set;
classify the input data into the N classes based on the features extracted by the target domain feature extraction unit, and output a source domain classification result;
classify the input data into the N classes based on the feature extracted by the common feature extraction unit, and output a common classification result; and integrate the source domain classification result and the common classification result, and output a final result.

9. The inference apparatus according to claim 8, wherein the third processor calculates a sum of confidence scores of the source domain classification result and the common classification result for each of the N classes, and outputs a class, in which the sum is highest, as the final result.

10. An inference apparatus comprising
a fourth memory storing instructions; and
one or more fourth processors configured to execute the instructions to:
extract features of input data by operating as each of a target domain feature extraction unit and a common feature extraction unit, to each of which parameters updated by the learning apparatus according to claim 1 are set;
classify the input data into the (N-c) classes based on the features extracted by the target domain feature extraction unit, and output a target domain classification result;
classify the input data into the N classes based on the features extracted by the common feature extraction unit, and output a common classification result;
classify the input data into the N classes based on the features extracted by the target domain feature extraction unit, and output a source domain classification result; and
integrate the target domain classification result, the common classification result, and the source domain classification result, and output a final result.

11. The inference apparatus according to claim 10, wherein the fourth processor calculates a sum of confidence scores of the source domain classification result and the common classification result for each class, and sets a class having the highest sum as a non-target domain classification result, and
the fourth processor further outputs the target domain classification result as the final result in a case of corresponding either one of cases (a) through (d), and outputs the non-target domain classification result as the final result in a case of not corresponding to any of the cases (a) through (d):
(a) by the target domain classification result and the non-target domain classification result, the same class is output with the highest confidence score, and the highest confidence scores of the target domain classification result and the non-target domain classification result are equal to or greater than a first threshold value,
(b) by the target domain classification result and the non-target domain classification result, the same class is output with the highest confidence score, and a distance between a distribution of the target domain classification result and a distribution of the non-target domain classification result is equal to or less than a second threshold value,
(c) confidence scores of c classes in the non-target domain classification result are equal to or less than a third threshold value, and the highest confidence scores of the target domain classification result and the non-target domain classification result are equal to or greater than the first threshold value, and
(d) the confidence scores of the c classes in the non-target domain classification result are equal to or less than the third threshold value, and the distance between the distribution of the target domain classification result and the distribution of the non-target domain classification result is equal to or less than the second threshold value.

12. The inference apparatus according to claim 10, wherein the fourth processor
calculates a sum of confidence scores of the source domain classification result and the common classification result for each of the N classes, and sets a class having the highest sum as a non-target domain classification result,
outputs the non-target domain classification result as the final result in a case where respective confidence scores of n classes in the non-target domain classification result are equal to or greater than a fourth threshold value, and outputs the target domain classification result as the final result in other cases.

13. A learning method comprising:
extracting unique features of target domain data by a target domain feature extraction unit;
classifying the target domain data into (N-c) classes based on the unique features of the target domain data;
extracting unique features of source domain data by a source domain feature extraction unit;
classifying the source domain data into N classes based on the unique features of the source domain data;
extracting common features of the target domain data and common features of the source domain data by a common feature extraction unit;
classifying the target domain data and the source domain data into the N classes based on the common features of the target domain data and the common features of the source domain data;
calculating a first distance between the common features of the target domain data and the common features of the source domain data;
calculating a second distance between the unique features of the target domain data and the unique features of the source domain data; and
updating parameters of the common feature extraction unit based on the first distance, and updating parameters of the target domain feature extraction unit and the source domain feature extraction unit based on the second distance.

14. A non-transitory computer-readable recording medium storing a program, the program causing a computer to perform a process comprising:
extracting unique features of target domain data by a target domain feature extraction unit;
classifying the target domain data into (N-c) classes based on the unique features of the target domain data;
extracting unique features of source domain data by a source domain feature extraction unit;
classifying the source domain data into N classes based on the unique features of the source domain data;
extracting common features of the target domain data and common features of the source domain data by a common feature extraction unit;
classifying the target domain data and the source domain data into the N classes based on the common features of the target domain data and the common features of the source domain data;
calculating a first distance between the common features of the target domain data and the common features of the source domain data;
calculating a second distance between the unique features of the target domain data and the unique features of the source domain data; and updating parameters of the common feature extraction unit based on the first distance, and updating parameters of the target domain feature extraction unit and the source domain feature extraction unit based on the second distance.

* * * * *

UNITED STATES PATENT AND TRADEMARK OFFICE
CERTIFICATE OF CORRECTION

| | |
|---|---|
| PATENT NO. | : 12,154,317 B2 |
| APPLICATION NO. | : 17/760826 |
| DATED | : November 26, 2024 |
| INVENTOR(S) | : Shigeaki Namiki, Shoji Yachida and Takashi Shibata |

Page 1 of 1

It is certified that error appears in the above-identified patent and that said Letters Patent is hereby corrected as shown below:

In the Claims

In Claim 4, Column 21, Line 58 delete "The learning apparatus according to claims 1 through 3" and insert --The learning apparatus according to claim 1,--

Signed and Sealed this
Thirty-first Day of December, 2024

Derrick Brent
*Acting Director of the United States Patent and Trademark Office*